US011511769B2

(12) United States Patent
Sumikawa et al.

(10) Patent No.: US 11,511,769 B2
(45) Date of Patent: Nov. 29, 2022

(54) DATA COLLECTING SYSTEM, SERVER, AND DATA PROCESSING APPARATUS

(71) Applicant: SUBARU CORPORATION, Tokyo (JP)

(72) Inventors: Ryuichi Sumikawa, Tokyo (JP); Tomoyuki Okada, Tokyo (JP); Yosuke Takebayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 275 days.

(21) Appl. No.: 16/743,404

(22) Filed: Jan. 15, 2020

(65) Prior Publication Data

US 2020/0307624 A1 Oct. 1, 2020

(30) Foreign Application Priority Data

Mar. 26, 2019 (JP) .............................. JP2019-058085
Mar. 26, 2019 (JP) .............................. JP2019-058088

(51) Int. Cl.
*B60W 60/00* (2020.01)
*H04W 4/44* (2018.01)
(Continued)

(52) U.S. Cl.
CPC ......... *B60W 60/001* (2020.02); *G05D 1/0212* (2013.01); *G05D 1/0276* (2013.01);
(Continued)

(58) Field of Classification Search
CPC ........... B60W 60/001; B60W 2556/45; B60W 2540/00; H04W 4/029; G05D 1/0212; G05D 1/0276

See application file for complete search history.

(56) References Cited

U.S. PATENT DOCUMENTS

2009/0210302 A1    8/2009   Tashev et al.
2016/0163129 A1*   6/2016   Elnajjar ............... G07C 5/0866
                                                                701/29.6
(Continued)

FOREIGN PATENT DOCUMENTS

JP          2002-150343 A    5/2002
JP          2002-208093 A    7/2002
(Continued)

OTHER PUBLICATIONS

Japanese Notice of Reasons for Refusal issued in corresponding Japanese Patent Application No. 2019-058085, dated Aug. 2, 2022, with English translation.
(Continued)

*Primary Examiner* — Peter D Nolan
*Assistant Examiner* — Mikko Okechukwu Obioha
(74) *Attorney, Agent, or Firm* — McDermott Will & Emery LLP

(57) ABSTRACT

A data collecting system includes a server and a data processing apparatus. The server holds at least one piece of request data including at least a content of a request for collection of traveling state data on a vehicle and a requisite condition for the collection of the traveling state data. The server sends request data of interest to the data processing apparatus. The data processing apparatus acquires the traveling state data on the vehicle on the basis of the request data of interest received from the server, and sends the acquired traveling state data to the server.

14 Claims, 16 Drawing Sheets

(51) Int. Cl.
    *H04W 4/38*     (2018.01)
    *G05D 1/02*     (2020.01)
    *H04W 4/029*     (2018.01)

(52) U.S. Cl.
    CPC ............. *H04W 4/029* (2018.02); *H04W 4/38* (2018.02); *H04W 4/44* (2018.02); *B60W 2540/00* (2013.01); *B60W 2556/45* (2020.02)

(56) References Cited

U.S. PATENT DOCUMENTS

| | | | |
|---|---|---|---|
| 2020/0118020 A1* | 4/2020 | Soda ..................... | G08G 1/0112 |
| 2020/0250252 A1* | 8/2020 | Rocci ..................... | G07C 5/008 |
| 2020/0265655 A1* | 8/2020 | Ha ......................... | G06Q 10/20 |

FOREIGN PATENT DOCUMENTS

| | | | |
|---|---|---|---|
| JP | 2002-298148 | A | 10/2002 |
| JP | 2003-279358 | A | 10/2003 |
| JP | 2005-044058 | A | 2/2005 |
| JP | 2011-517794 | A | 6/2011 |
| JP | 2015-184885 | A | 10/2015 |
| JP | 2016-058044 | A | 4/2016 |
| JP | 2016-218824 | A | 12/2016 |
| JP | 2018-055581 | A | 4/2018 |
| JP | 2019-040176 | A | 3/2019 |

OTHER PUBLICATIONS

Japanese Notice of Reasons for Refusal issued in corresponding Japanese Patent Application No. 2019-058088, dated Sep. 6, 2022, with English translation.

\* cited by examiner

DATA COLLECTING SYSTEM, SERVER, AND DATA PROCESSING APPARATUS

CROSS-REFERENCE TO RELATED APPLICATIONS

The present application claims priority from Japanese Patent Application Nos. 2019-058085 filed on Mar. 26, 2019, and 2019-058088 filed on Mar. 26, 2019, the entire contents of each of which are hereby incorporated by reference.

BACKGROUND

The disclosure relates to a data collecting system, a server, and a data processing apparatus that collect traveling state data on a vehicle.

There is a recent demand for collection of traveling state data on a vehicle under various conditions. For example, Japanese Unexamined Patent Application Publication (JP-A) No. 2005-044058 discloses a technique relevant to a data collecting system that includes a server collecting and providing traveling state data on a vehicle sold in the past, at the time of purchase of a new vehicle of the same type as the sold vehicle.

SUMMARY

An aspect of the technology provides a data collecting system including a server and a first data processing apparatus. The server is configured to hold at least one piece of request data including at least a content of a request for collection of traveling state data on a vehicle and a requisite condition for the collection of the traveling state data. The content of the request and the requisite condition are set by a client. The requisite condition is directed to a consignee who undertakes the request. The first data processing apparatus is configured to acquire the traveling state data on the vehicle. The server is configured to send request data of interest to the first data processing apparatus. The request data of interest is selected from the at least one piece of request data held in the server. The first data processing apparatus is configured to acquire the traveling state data on the vehicle on the basis of the request data of interest received from the server, and to send the acquired traveling state data to the server.

An aspect of the technology provides a server including circuitry configured to hold at least one piece of request data and to send request data of interest to the first data processing apparatus. The at least one piece of request data includes at least a content of a request for collecting of traveling state data on a vehicle and a requisite condition for the collection of the traveling state data. The content of the request and the requisite condition are set by a client. The requisite condition is directed to a consignee who undertakes the request. The request data of interest is selected from the at least one piece of request data held in the server.

An aspect of the technology provides a data processing apparatus including a processor and a communicator configured to communicate with an external device outside the vehicle. The communicator is configured to receive request data including a content of a request for collection of traveling state data on a vehicle. The content of the request is set by a client. The processor is configured to acquire the traveling state data on the basis of the request data satisfying a request acceptance condition set by a consignee. The communicator is configured to send the traveling state data acquired by the processor.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

It is desirable to provide a data collecting system, a server, and a data processing apparatus that make it possible to collect traveling state data on a vehicle consistent with client's requirements.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

1. First Embodiment

1.1 Outline of Data Collecting System

Figure 1:
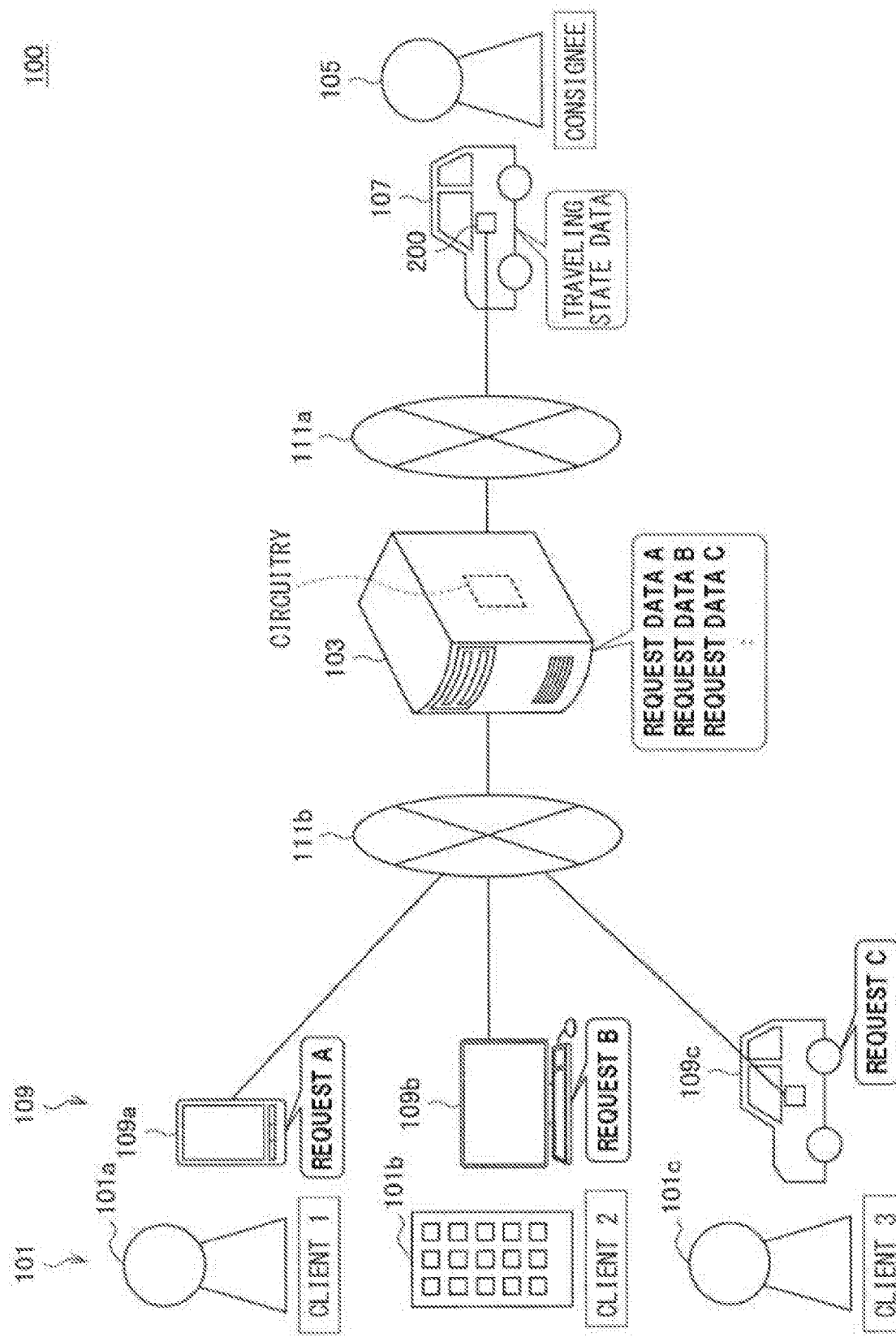
FIG. 1 is a diagram illustrating an example network configuration according to one example embodiment of the technology.

First, an outline of a data collecting system 100 that collects traveling state data on a vehicle according to a first embodiment of the technology will now be described with reference to FIG. 1. FIG. 1 illustrates an example network 156 configuration according to the first embodiment of the technology. The data collecting system 100 according to the first embodiment is a system that collects traveling state data on a vehicle. Herein, the data collecting system that collects traveling state data on a vehicle may be simply referred to as a "data collecting system". As illustrated in FIG. 1, a client 101 who places a request for collection of traveling state data may send a request for collection of the traveling state data to a consignee 105 who receives the request through a server 103 in the data collecting system 100 of the embodiment. Additionally, the data collecting system 100 may collect traveling state data which is results of the fulfillment of the request by the consignee 105.

In the first embodiment, the data collecting system 100 causes the server 103 to store request data containing at least the content of request for data collection and a requisite condition for the data collection. The content of the request and the requisite condition are set by the client 101. In a case where requests A, B, and C are made by respective clients 101a, 101b, and 101c, request data (a request data group) that includes data on the request A, data on the request B, and data on the request C may be stored in the server 103. The server 103 sends at least one of the request data in the request data group stored in the server 103 to a data processing apparatus 200 on the side of the consignee 105 that satisfies the requisite condition for data collection. The data processing apparatus 200 on the side of the consignee 105 may be hereinafter referred to as a "consignee-side data processing apparatus" 200. In one embodiment, the consignee-side data processing apparatus 200 may serve as a "first data processing apparatus". The consignee 105 may confirm the content of request in the request data received at the consignee-side data processing apparatus 200, undertake the request, and carry out the request. The results of the fulfillment of the request or the traveling state data is sent from the consignee-side data processing apparatus 200 to the server 103. The server 103 sends the collected traveling state data to a data processing apparatus 109 on the side of the client 101. The data processing apparatus 109 on the side of the client 101 may be hereinafter referred to as a "client-side data processing apparatus" 109. In one embodiment, the client-side data processing apparatus 109 may serve as a "second data processing apparatus".

The requisite condition for data collection may be conditions regarding the state of a vehicle 107 of the consignee 105 when the consignee 105 undertakes the request and the consignee-side data processing apparatus 200 starts acquiring the traveling state data. The requisite condition for data collection may thus not include data irrelevant to the states of the consignee 105 and the vehicle 107 of the consignee 105, such as a type, history, or a traveling route of the vehicle.

The requisite condition for data collection may include data on the consignee 105 themselves, for example. Examples of the data on the consignee 105 themselves may include gender, driving experiences, or skills of the consignee 105, the number of past requests undertaken, the rate of fulfillment of requests, or evaluations of the results of fulfillment of requests. Alternatively, the requisite condition for data collection may include data on the vehicle 107 of the consignee 105. Examples of the data on the vehicle 107 may include a travel distance of the vehicle 107, the presence of occupant(s) or the number of the occupants, or a type, performance, or sensitivity of a component installed in the vehicle 107.

The client 101 should not be limited to an individual person. The client 101 may be a business institution, a municipality, a public institution, or other organizations. In one example, the consignee 105 may be a driver or an owner of the vehicle 107.

The traveling state data may include various pieces of data on traveling of the vehicle 107, such as a condition of the vehicle 107 itself, functions of the vehicle 107, states of components of the vehicle 107, or an environment around the vehicle 107 including weather and a road surface condition, for example.

The content of request should not be limited to a particular content and may be any content relevant to the collection of the traveling state data. For example, if the client 101 is a road management company, a request may be made to collect traveling state data regarding the status of a specific road surface, weather, or the like. If the client 101 is a car manufacturer, a request may be made to collect traveling state data regarding how the vehicle sold before and its accessories have been used by a user, or the like. If the client 101 is planning a travel or a traveler on a trip, a request may be made to collect traveling state data regarding the weather of a destination, scenery of the destination, an arrival time to the destination, traffic congestion, or the like.

Optionally, the request data may include one or more conditions selected from a type, a model code, and age of service (history) of the vehicle 107 of the consignee 105, in addition to the content of request and the requisite condition for data collection.

1.2 Example Network Configuration

An example network configuration of the data collecting system 100 will now be described with reference to FIG. 1. As illustrated in FIG. 1, the data collecting system 100 includes the server 103 and the consignee-side data processing apparatus 200. The consignee-side data processing apparatus 200 may be disposed in the vehicle 107 and acquires the traveling state data on the vehicle 107. The data collecting system 100 may further include the client-side data processing apparatus 109.

The server 103 includes circuitry configured to store at least one piece of request data containing the content of request for collection of traveling state data and the requisite condition for data collection that are set by the client 101. The circuitry of the server 103 may determine whether the consignee 105 or the vehicle 107 satisfies the requisite condition for data collection. The circuitry of the server 103 sends at least one piece of the request data stored therein to the consignee-side data processing apparatus 200 on the basis of the results of the determination. Additionally, the circuitry of the server 103 may send the traveling state data received from the consignee-side data processing apparatus 200 to the client-side data processing apparatus 109. In the following description, operations of the circuitry of the server 103 may be described as operations of the server 103 for the purpose of convenience.

The data processing apparatus 200 may be coupled to the server 103 via a network 111a to communicate with each other. The consignee-side data processing apparatus 200 may send data on the consignee 105 or the vehicle 107 to the server 103. The consignee-side data processing apparatus 200 acquires the traveling state data on the vehicle 107 on the basis of the request data received from the server 103. Additionally, the consignee-side data processing apparatus 200 sends the acquired traveling state data to the server 103. The consignee-side data processing apparatus 200 will be described in detail later.

The client-side data processing apparatus 109 may be coupled to the server 103 via the network 111b to communicate with each other. The client 101 may place a request for collection of traveling state data and set a requisite condition for data collection using the client-side data processing apparatus 109. The client-side data processing apparatus 109 may send the data on the request to the server 103 via the network 111b. The client-side data processing apparatus 109 should not be limited to a particular apparatus. The client-side data processing apparatus 109 may be any apparatus that communicates with the server 103 to receive request data. Examples of the client-side data processing apparatus 109 may include a smartphone 109a, a personal computer 109b, and an in-vehicle controller 109c, as illustrated in FIG. 1.

1.3 Example Configuration of Consignee-Side Data Processing Apparatus

Figure 2:
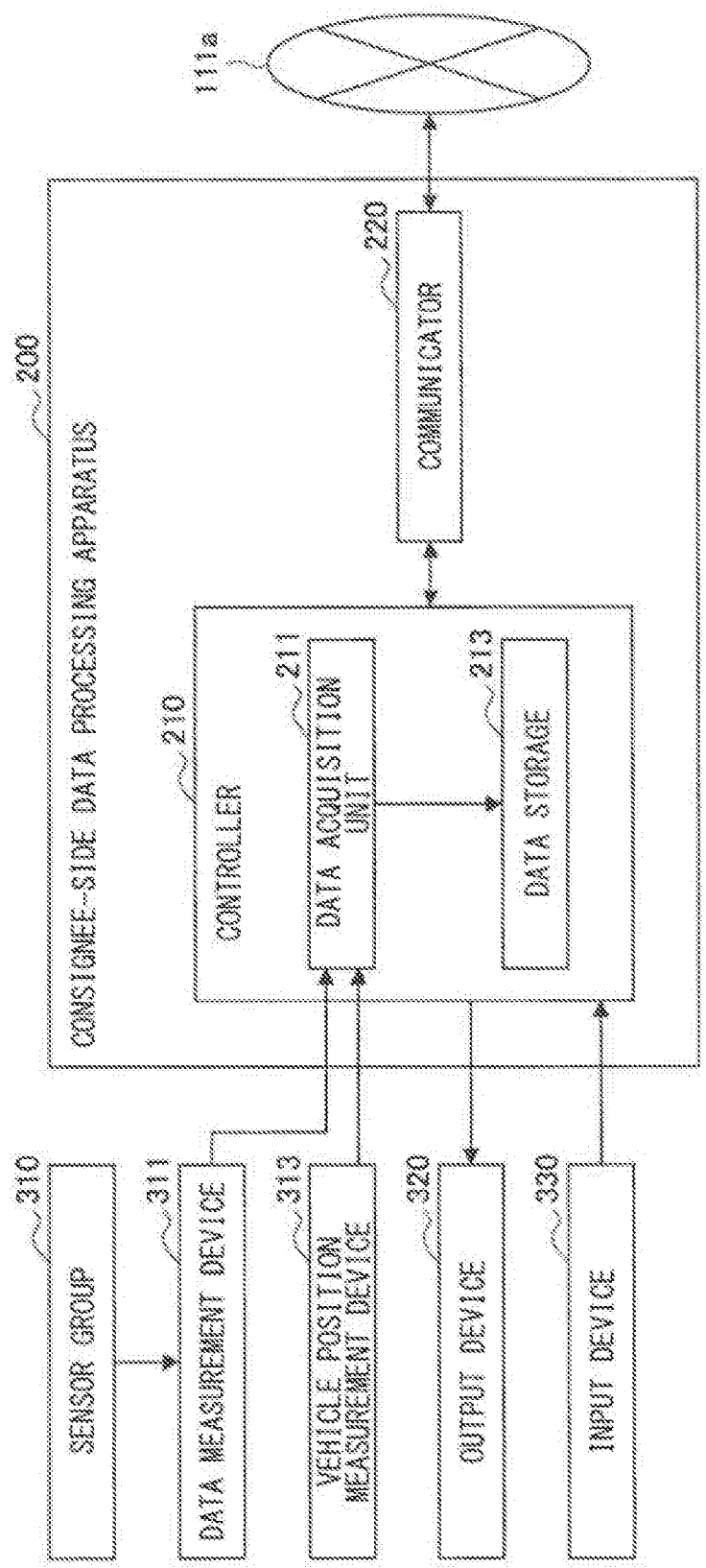
FIG. 2 is a block diagram illustrating an example data processing apparatus according to one example embodiment.

Next, an example configuration of the consignee-side data processing apparatus 200 according to the first embodiment will now be described with reference to FIG. 2. FIG. 2 is a block diagram illustrating the example configuration of the consignee-side data processing apparatus 200 according to the first embodiment. The consignee-side data processing apparatus 200 may include a controller 210 and a communicator 220.

The controller 210 may execute control necessary for carrying out various functions, such as controlling a sensor group 310 to acquire the traveling state data, storing the acquired traveling state data, or outputting the traveling state data to the communicator 220, for example.

The communicator 220 may communicate with an external device outside the consignee-side data processing apparatus 200 via the network 111a.

The consignee-side data processing apparatus 200 may be, for example, an in-vehicle control apparatus. The controller 210 may have functions implemented by, for example, a central processing unit (CPU), a random access memory (RAM), and a read only memory (ROM) that are installed in the in-vehicle control apparatus and may operate in cooperation with one another. The communicator 220 may have functions implemented by, for example, a wireless communication interface.

The controller 210 may include a data acquiring unit 211 and a data storage 213. The data acquiring unit 211 may acquire various pieces of data outputted from a data measurement device 311 and a vehicle position measurement device 313. The data storage 213 may temporarily or permanently store various pieces of data acquired by the data acquiring unit 211.

The data measurement device 311 may obtain the traveling state data on the vehicle 107 on the basis of a sensor signal received from the sensor group 310. The sensor group 310 may include a plurality of sensors that acquire various pieces of data as the traveling state data. For example, the sensor group 310 may include one or more selected from a vehicle wheel speed sensor, a vehicle speed sensor, an acceleration sensor, an angular rate sensor, a temperature sensor, a humidity sensor, a raindrop sensor, an illuminance sensor, a load sensor, a steering angle sensor, a sound collection sensor (microphone), a vibration sensor, an image camera, a radar, and an ultrasonic sensor. The data measurement device 311 may measure a speed, an acceleration rate, and an angular acceleration rate of the vehicle 107, an estimated value of the roughness of a road surface, and an ambient temperature and humidity, for example. Additionally, the data measurement device 311 may capture still images and/or moving images of the surroundings of the vehicle 107 and detect sounds.

The vehicle position measurement device 313 may measure a current position of the vehicle 107. The vehicle position measurement device 313 may be a global positioning system (GPS) antenna, for example.

The output device 320 may output the results of processing executed by the controller 210 to an external device. Examples of the output device 320 may include a display panel, a head-up display, and a speaker. The input device 330 may receive an input from a user of the consignee-side data processing apparatus 200. Examples of the input device 330 may include a button, a touch screen, and a microphone.

Note that the consignee-side data processing apparatus 200 should not be limited to an in-vehicle apparatus. The consignee-side data processing apparatus 200 may be any device that acquires the traveling state data on the vehicle 107. For example, the consignee-side data processing apparatus 200 may be a smartphone or a tablet computer that communicates with various sensors or control devices in the vehicle 107. In this case, the output device 320 and the input device 330 may be integrated with the consignee-side data processing apparatus 200 into a single component. Alternatively, some or all of the sensors in the sensor group 310 may be sensors or functions installed in a smartphone, for example.

1.4. Example Operation of Data Collecting System

Figure 3:
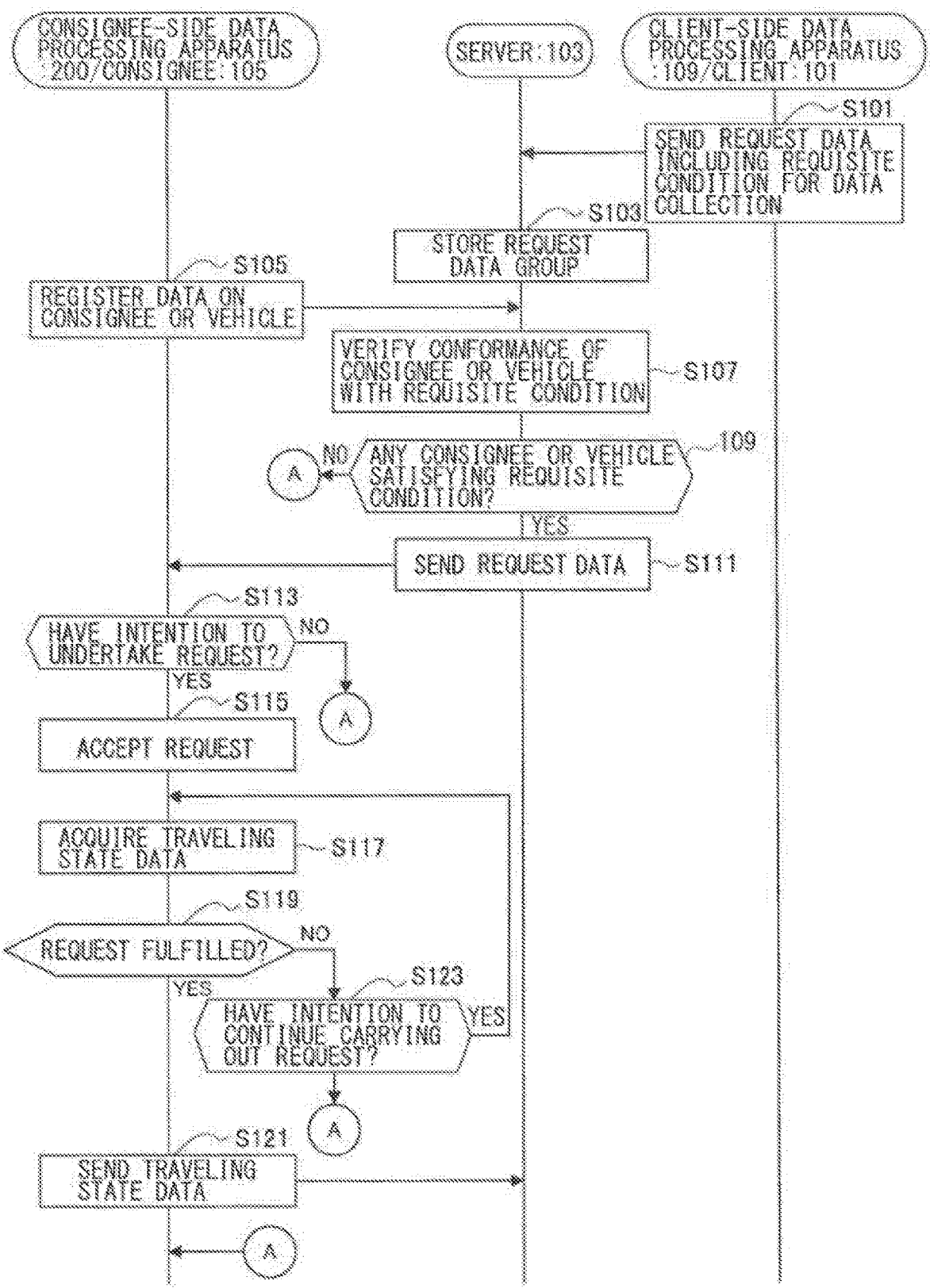
FIG. 3 is a sequence diagram illustrating an example operation of a data collecting system according to one example embodiment.

An example operation of the data collecting system 100 according to the first embodiment will now be described with reference to FIG. 3. FIG. 3 is a sequence diagram illustrating an example operation of the data collecting system 100 according to the first embodiment. With reference to FIG. 3, the client 101 may first send request data to the server 103 using the client-side data processing apparatus 109 (Step S101). The request data may include a requisite condition for data collection. The server 103 may store the request data received from the client-side data processing apparatus 109 (Step S103). Thereafter, the consignee 105 may register data on the consignee 105 or the vehicle 107 with the server 103 via the consignee-side data processing apparatus 200 (Step S105).

The server 103 may verify conformance of the consignee 105 or the vehicle 107 with the requisite condition for data collection in the request data (Step S107). The server 103 may determine whether there is any consignee 105 or vehicle 107 that satisfies the requisite condition for data collection on the basis of the result of the verification in Step S107 (Step S109). If the server 103 determines that there is no consignee 105 or vehicle 107 that satisfies the requisite condition for data collection (Step S109: NO), the procedure according to the first embodiment may end. In contrast, if the server 103 determines that there is a consignee 105 or a vehicle 107 that satisfies the requisite condition for data collection (Step S109: YES), the server 103 may send at least one piece of request data to the consignee-side data processing apparatus 200 (Step S111). When receiving the request data, the consignee-side data processing apparatus 200 may determine whether the consignee 105 has an intention to undertake the request indicated by the request data (Step S113). For example, the consignee-side data processing apparatus 200 may determine whether the consignee 105 has an intention to undertake the request on the basis of whether the consignee 105 has performed a process of accepting any piece of the request data. If the consignee-side data processing apparatus 200 determines that the consignee 105 has an intention to undertake the request (Step S113: YES), the request may be accepted (Step S115). In contrast, if the consignee-side data processing apparatus 200 determines that the consignee 105 has no intention to undertake the request (Step S113: NO), the procedure according to the first embodiment may end.

After the request is accepted in Step S115, the consignee-side data processing apparatus 200 may start acquiring the traveling state data (Step S117). For example, the data acquiring unit 211 of the consignee-side data processing apparatus 200 may acquire data necessary for fulfillment of the request outputted from the data measurement device 311 or the vehicle position measurement device 313. Additionally, the consignee-side data processing apparatus 200 may provide the driver with information (e.g., a designated driving method or a route) by means of sound, image, or the like, depending on the content of request. Thereafter, the consignee-side data processing apparatus 200 may determine whether the content of request in the request data is fulfilled (Step S119). If the request is determined as being fulfilled (Step S119: YES), the consignee-side data processing apparatus 200 may send the traveling state data to the server 103 (Step S121). In a case where the consignee 105 has undertaken a plurality of requests, the traveling state data may be sent to the server 103 every time each request is fulfilled. Alternatively, a plurality of pieces of the traveling state data relevant to the plurality of requests may be collectively sent to the server 103.

In contrast, if the request is determined as not being fulfilled (Step S119: NO), it may be determined whether the consignee 105 has an intention to continue carrying out the request (Step S123). If the consignee 105 has an intention to continue carrying out the request (Step S123: YES), the procedure may return to Step S117 in which the traveling state data is acquired. If the consignee 105 has no intention to continue carrying out the request (Step S123: NO), the procedure according to the first embodiment may end. One example operation of the data collecting system 100 according to the first embodiment has been described in the above.

In the example described above, the consignee-side data processing apparatus 200 may send the traveling state data to the server 103 in Step S121 after the request is determined as being fulfilled in Step S119. Alternatively, the traveling state data may be sent to the server 103 when needed before the fulfillment of the request.

In a possible case where a client, who places a request for data collection, specifies a vehicle type, a vehicle history, a traveling path, a traveling condition, and a valid time of the request for traveling, and where the server 103 transmits data on the request for traveling to an owner of a vehicle that satisfies these requirements, a recipient or consignee to which the traveling request data is to be sent may be determined on the basis of the specified data on the vehicle type, the vehicle history, and a recent traveling path, for example. In this case, the recipient or consignee is designated without taking into consideration of conditions of a vehicle of the recipient or owner upon the data collection. This can hinder fulfillment of the request for data collection consistent with the client's more specific wishes.

According to the first embodiment of the technology, however, the server 103 may determine whether the consignee 105 or the vehicle 107 satisfies the requisite condition for data collection set by the client 101. The server 103 may send the request data to the consignee-side data processing apparatus 200 of the consignee 105 that satisfies the requisite condition for data collection, and the consignee 105 may start fulfilling the request. This achieves fulfillment of the request consistent with client's specific wishes without wasting time and efforts of the consignee 105 on selection of requests. Accordingly, it is possible to collect traveling state data consistent with client's wishes.

Further, according to the first embodiment, the requisite condition for data collection in the request data may include data on the vehicle 107 of the consignee 105. Accordingly, the traveling state data acquired by the consignee-side data processing apparatus 200 is more consistent with the client's 101 wishes in accuracy and content.

In the example described above, the data on the consignee 105 or the vehicle 107 may be registered with the server 103 by the consignee 105 using the consignee-side data processing apparatus 200 in Step S105. Embodiments of the technology, however, should not be limited thereto. For example, the server 103 may determine whether the consignee 105 or the vehicle 107 satisfies the requisite condition for data collection in the request data on the basis of the data on the consignee 105 or the vehicle 107 stored in the server 103 in advance.

1.5. Modification Example 1

Figure 4A:
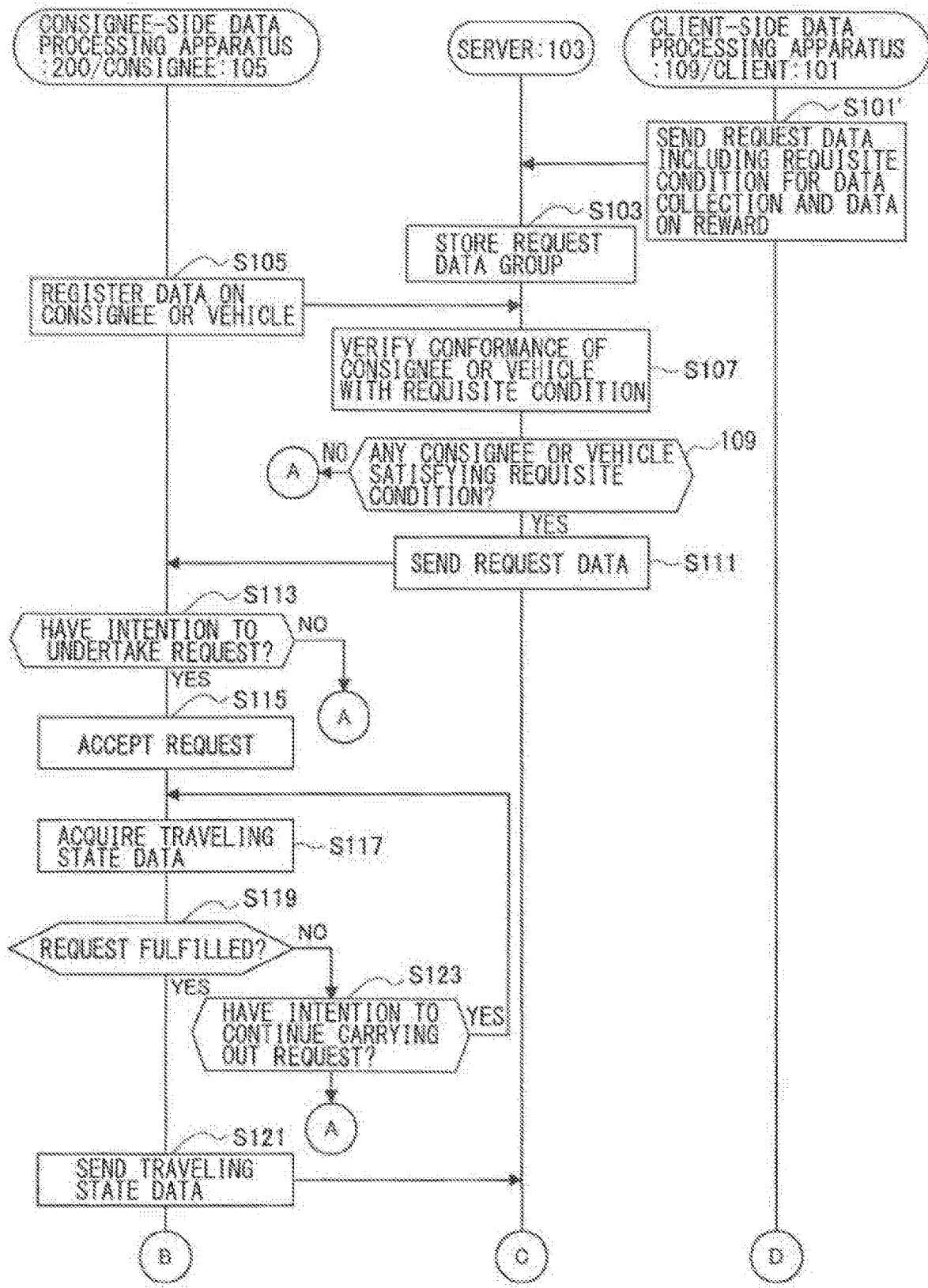
FIG. 4A is a sequence diagram illustrating a modification example of the data collecting system according one example embodiment.
Figure 4B:
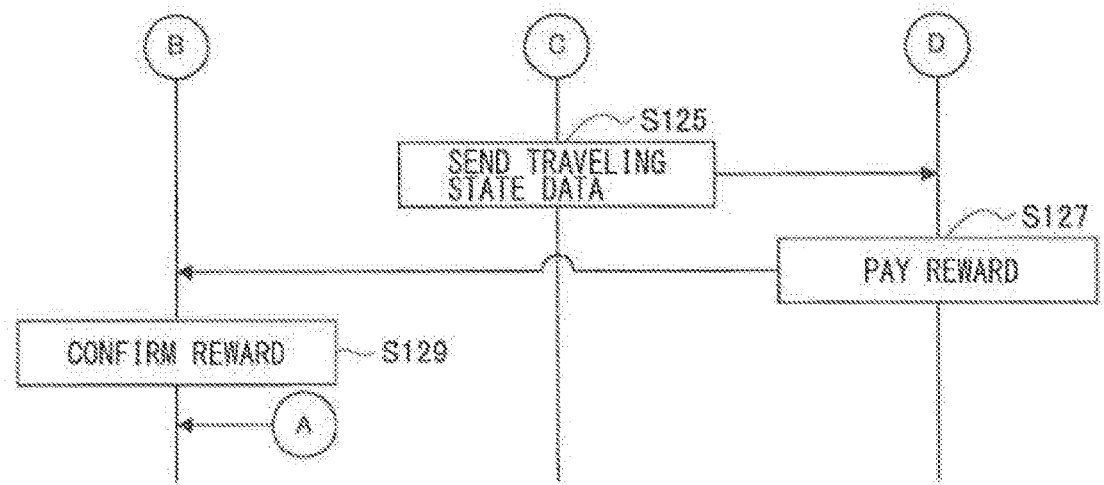
FIG. 4B is a sequence diagram illustrating a modification example of the data collecting system according to one example embodiment.

One modification example of the data collecting system 100 according to the first embodiment will now be described with reference to FIGS. 4A and 4B. FIGS. 4A and 4B are sequence diagrams each illustrating an example operation of the data collecting system 100 according to the modification example. In the modification example, the request data may further include data on a reward for a request. The reward for a request may be set by the client 101. After the consignee 105 has undertaken and fulfilled the request, the reward may be paid from the client 101 to the consignee 105. Since other configurations in the modification example are substantially common to those in the first embodiment, the description thereof is not repeated here.

As illustrated in FIG. 4A, the client 101 may set the content of request as well as the data on a reward for the request, and may send the request data to the server 103 (Step S101').

The reward may be set to be variable depending on the requisite condition for data collection. For example, the higher the degree of conformance of the consignee 105 with the requisite condition for data collection in the request data is, the better the reward may become in quality. In an example where a plurality of requisite conditions for data collection is set, the degree of conformance of the consignee 105 with the requisite conditions for data collection may increase with an increase in the number of the requisite conditions for data collection that the consignee 105 satisfies. In this example, the reward may become better in quality as the degree of conformance of the consignee 105 increases. In another example where the requisite condition for data collection is about equipment of a vehicle, the degree of conformance of the consignee 105 with the requisite condition for data collection may increase as the equipment of the vehicle 107 has higher accuracy or is newer. In this example, the reward may become better in quality as the degree of conformance of the consignee 105 increases. Steps S103 to S119 subsequent to Step S101' in the modification example may be substantially the same as those in the sequence diagram illustrated in FIG. 3.

The traveling state data may be sent from the consignee-side data processing apparatus 200 to the server 103 (Step S121). Thereafter, with reference to FIG. 4B, the server 103 may send the traveling state data to the client-side data processing apparatus 109 (Step S125). The client 101 may confirm information on the results of fulfillment of the request, and may pay a reward depending on the results of fulfillment (Step S127). The reward may be paid by transmitting the data on the reward from the client-side data processing apparatus 109 to the consignee-side data processing apparatus 200. The consignee 105 may confirm the data on the reward for the request (Step S129).

Alternatively, the reward may be automatically paid from the server 103 instead of the client 101, in the modification example. In this case, a charge for the reward may be sent to the client 101 separately.

The reward may be any item having economic values, such as money or points, or any item having social values, such as honor, positive esteem, or positive comments. The reward may be the provision of service instead of money.

Alternatively, the reward may be paid by a data processing system different from the data collecting system 100 according to the embodiment. For example, the reward may be paid from the client 101 to the consignee 105 through an electronic payment system using electronic currency, virtual currency, or credit cards. In this case, the data on the reward may not be send to the consignee 105. Alternatively, the data on the reward may include only a notice before or after the payment for the reward.

According to the modification example, the reward may be paid to the consignee 105 upon the fulfillment of the request. This gives the consignee 105 an incentive to undertake requests. Further, the consignee 105 is allowed to determine whether to undertake a request on the basis of the reward for the request. This encourages the consignee 105 to vigorously undertake a request and fulfill the request. As a result, it is possible to collect the traveling state data consistent with the client's 101 wishes.

1.6 Modification Example 2

Figure 5:
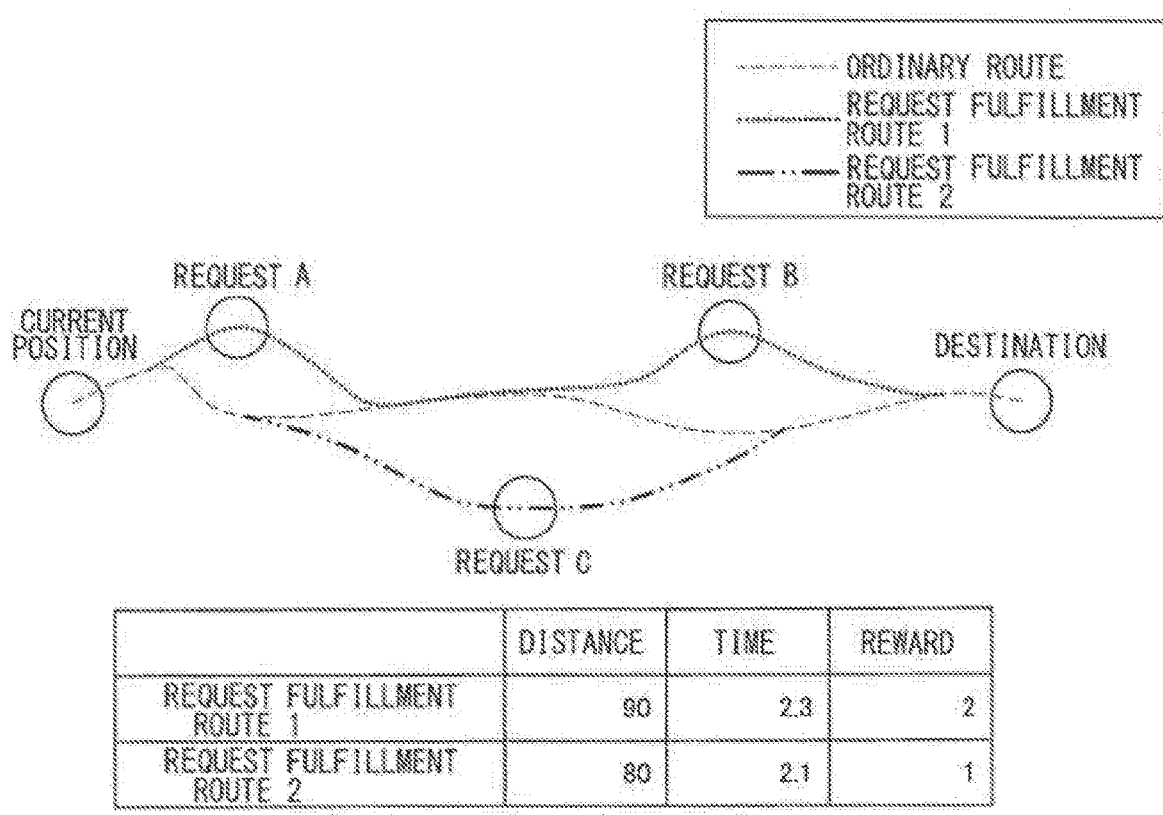
FIG. 5 is a diagram illustrating selection of a traveling route according to another modification example of one example embodiment.

In another modification example, the server 103 may send the request data to the consignee-side data processing apparatus 200 in a step corresponding to Step S107 of FIG. 3. After receiving the request data from the server 103, the consignee-side data processing apparatus 200 may calculate one or more pieces of traveling route data to efficiently fulfill the request on the basis of the content of request indicated by the request data, as illustrated in FIG. 5. Alternatively, the server 103 may calculate the traveling route data from the request data to be sent, and may send the traveling route data to the consignee-side data processing apparatus 200. For example, the server 103 may send, to the consignee-side data processing apparatus 200, the request data along with the traveling route data.

This allows the traveling route data to be calculated and presented to the consignee 105 without generating an excess load on the consignee-side data processing apparatus 200. Since the traveling route data is sent along with the request data from the server 103, it is possible for the consignee 105 to confirm the traveling route immediately after receiving the request data. This allows the consignee 105 to select a request to undertake on the basis of the traveling route, and promptly start carrying out the request.

2. Second Embodiment

Figure 6A:
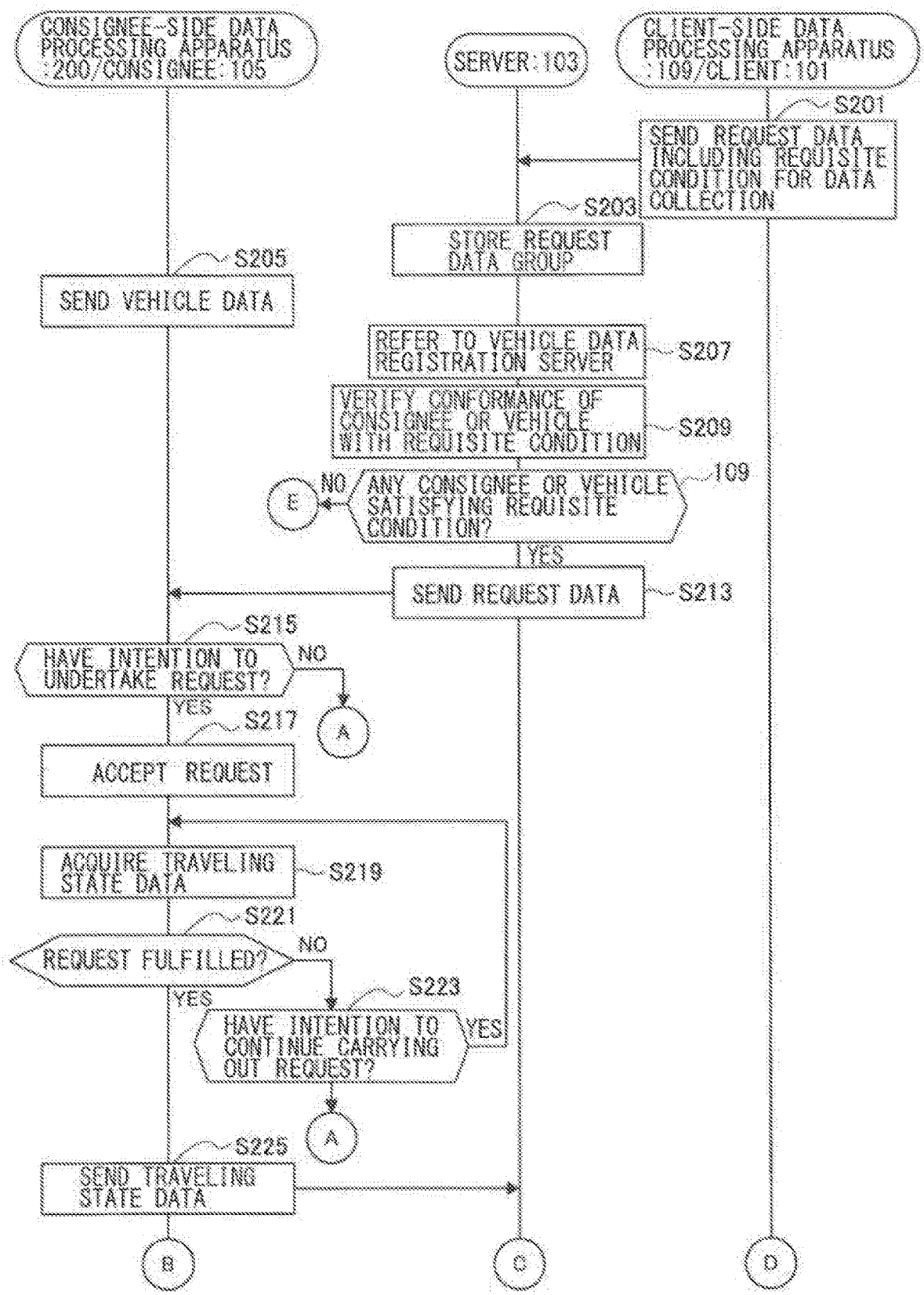
FIG. 6A is a sequence diagram illustrating an example operation of a data collecting system according to one example embodiment of the technology.
Figure 6B:
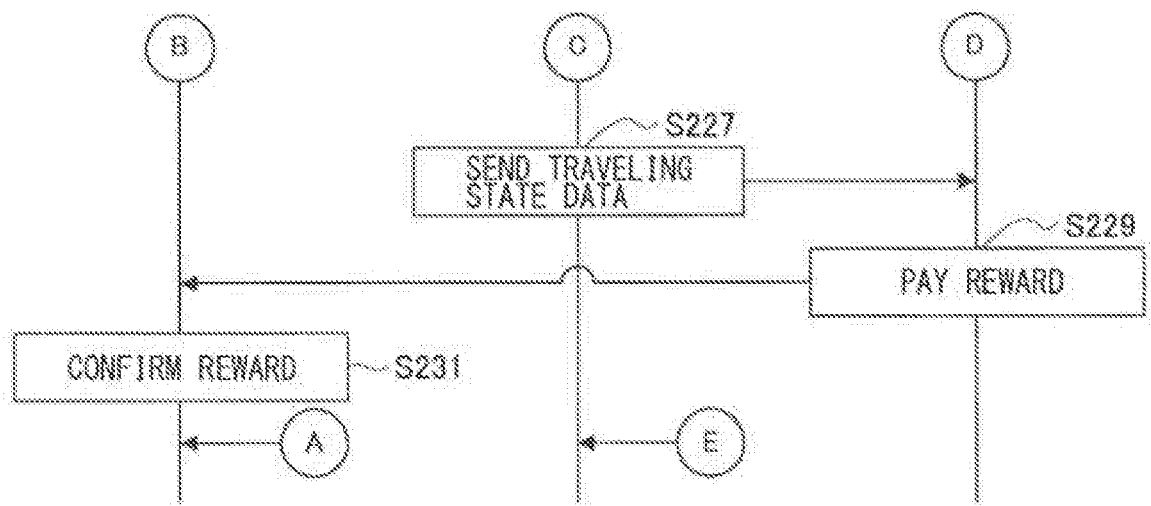
FIG. 6B is a sequence diagram illustrating an example operation of the data collecting system according to one example embodiment.
Figure 7:
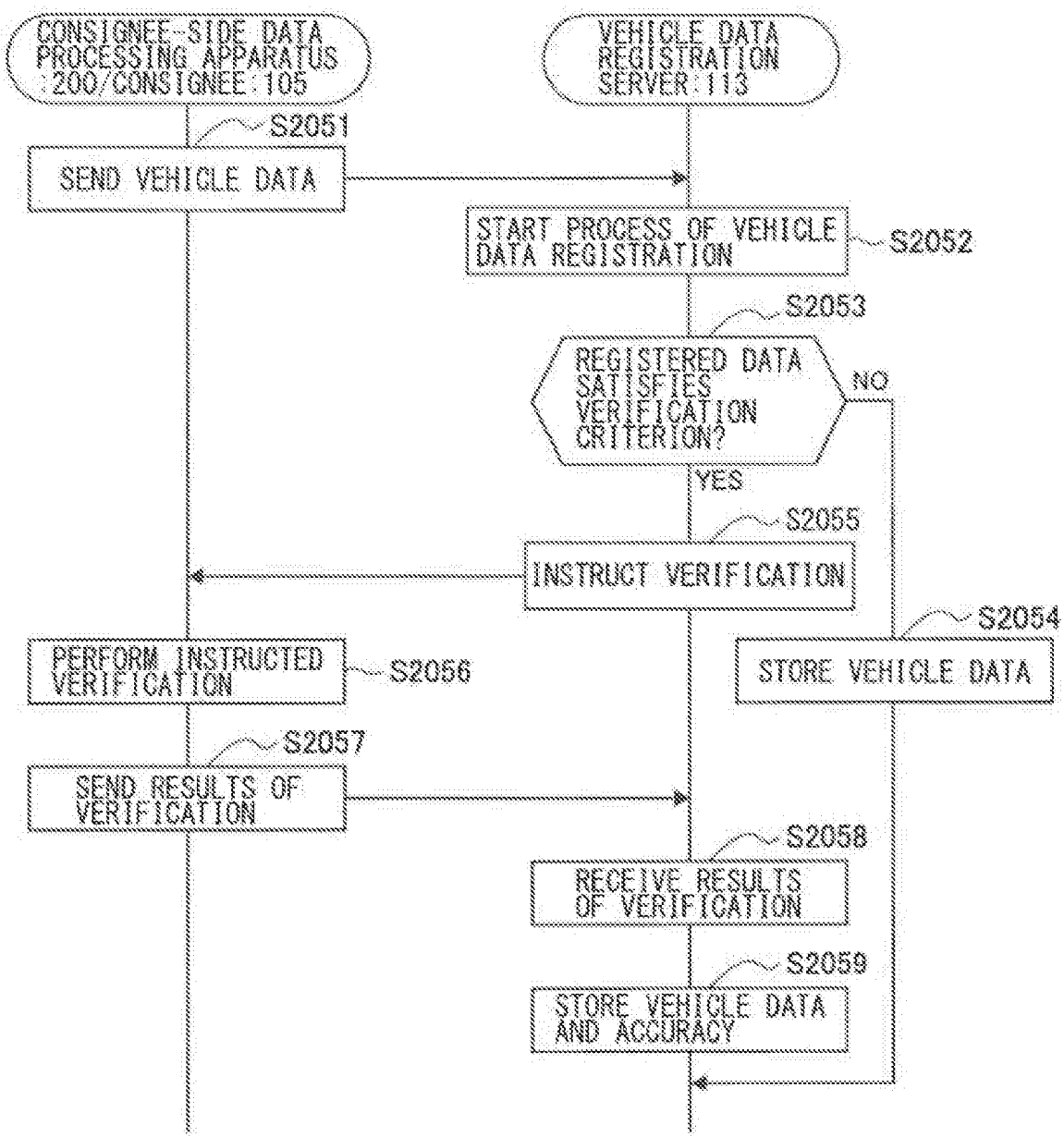
FIG. 7 is a sequence diagram illustrating vehicle data registration according to one example embodiment.

An example operation of the data collecting system 100 according to a second embodiment will now be described with reference to FIGS. 6A, 6B, and 7. FIGS. 6A and 6B are sequence diagrams each illustrating an example operation of the data collecting system 100 according to the second embodiment. FIG. 7 is a sequence diagram illustrating vehicle data registration according to the second embodiment. The data collecting system 100 according to the second embodiment may differ from the data collecting system 100 according to the first embodiment in that a determination is made as to whether accuracy of equipment or function of the vehicle 107 needs to be verified at the time of registration of the data on the vehicle 107. Note that the description of features of the data collecting system 100 according to the second embodiment common to those according to the first embodiment is not repeated here.

With reference to FIG. 6A, the client 101 may first send request data including the requisite condition for data collection to the server 103 using the client-side data processing apparatus 109 (Step S201). The server 103 may store the request data received from the client-side data processing apparatus 109 (Step S203).

The consignee-side data processing apparatus 200 may send the data on the vehicle 107 to a vehicle data registration server 113 (Step S205). Details of Step S205 will be described later. The server 103 may refer to the vehicle data registration server 113 (Step S207) to verify conformance of the registered data on the vehicle 107 of the consignee 105 with the requisite condition for data collection in the request data (Step S209). On the basis of the results of the verification in Step S209, the server 103 may determine whether there is any consignee 105 or vehicle 107 that satisfies the requisite condition for data collection (Step S211). If the server 103 determines that there is no consignee 105 or vehicle 107 that satisfies the requisite condition for data collection (Step S211: NO), the procedure according to the second embodiment may end. In contrast, if the server 103 determines that there is a consignee 105 or a vehicle 107 that satisfies the requisite condition for data collection (Step S211: YES), the server 103 may send the request data to the consignee-side data processing apparatus 200 (Step S213). Since Step S215 and subsequent steps illustrated in FIGS.

6A and 6B are substantially the same as Step S113 and the subsequent steps illustrated in FIG. 4A, the description thereof is not repeated here.

Now described is a process of vehicle data registration in Step 205 of FIG. 6A. With reference to FIG. 7, the consignee-side data processing apparatus 200 may first send the data on the vehicle 107 to the vehicle data registration server 113 (Step S2051). The vehicle data registration server 113 may start the process of vehicle data registration (Step S2052). The vehicle data registration server 113 may determine whether the vehicle data received from the consignee-side data processing apparatus 200 includes data satisfying a verification criterion (Step S2053). In an example case where a predetermined period of time has passed since a previous registration, data on equipment or function newly installed on the vehicle 107 may be verified. For example, the vehicle data registration server 113 may determine whether the vehicle data includes data on detection accuracy of an in-vehicle sensor that satisfies the verification criterion.

If the vehicle data registration server 113 determines that the vehicle data includes no data satisfying the verification criterion (Step S2053: NO), the vehicle data registration server 113 may store the vehicle data received from the consignee-side data processing apparatus 200 therein (Step S2054), and the process of vehicle data registration in Step S205 may end.

In contrast, if the vehicle data registration server 113 determines that the vehicle data includes data satisfying the verification criterion (Step S2053: YES), the vehicle data registration server 113 may instruct the consignee-side data processing apparatus 200 to perform the verification (Step S2055). The consignee-side data processing apparatus 200 may perform the verification necessary for the vehicle 107 and thereby acquire the results of the verification (Step S2056). For example, in a case where the detection accuracy of an in-vehicle sensor needs to be verified, the verification may be based on an error between a detection value detected by the in-vehicle sensor during past traveling on the traveling route and a true value calculated from the results of past measurements. The true value may be calculated from the results of measurements with a high-accuracy sensor or the results of statistical processing of past measurements.

The consignee-side data processing apparatus 200 may send the results of the verification of the vehicle data to the vehicle data registration server 113 (Step S2057). The vehicle data registration server 113 may receive the results of verification (Step S2058), and store the vehicle data and the accuracy after the verification (Step S2059). The process of vehicle data registration in Step S205 may thereby end. The process of vehicle data registration according to the second embodiment and the data collecting system 100 according to the second embodiment have been described in the above.

According to the second embodiment, the data on the vehicle 107 of the consignee 105 may be acquired with high accuracy. This results in a correct determination of conformance of the vehicle 107 of the consignee 105 with the requisite condition for data collection. Accordingly, it is possible to fulfill a request consistent with the client's 101 wishes. As a result, it is possible to collect the traveling state data consistent with the client's 101 wishes.

Further, according to the second embodiment, the accuracy of the equipment or function installed on the vehicle 107 may be verified. This results in a correct determination of conformance of the vehicle 107 of the consignee 105 with the requisite condition for data collection. Moreover, according to the second embodiment, the accuracy of the sensor installed in the vehicle 107 may be verified. This allows the sensor to acquire traveling state data with accuracy kept at a predetermined level. Accordingly, it is possible to collect the traveling state data consistent with the client's 101 wishes.

In the second embodiment described above, the vehicle data may be stored in the vehicle data registration server 113 that determines whether the accuracy of the vehicle data needs to be verified. Embodiments of the technology, however, should not be limited thereto. In an alternative embodiment, the server 103 may also serve as the vehicle data registration server. This eliminates the need for another server in addition to the server 103, reducing costs in association with the operation and maintenance of servers and time required for communicating with servers and calculating operation of servers.

3. Third Embodiment

Figure 8:
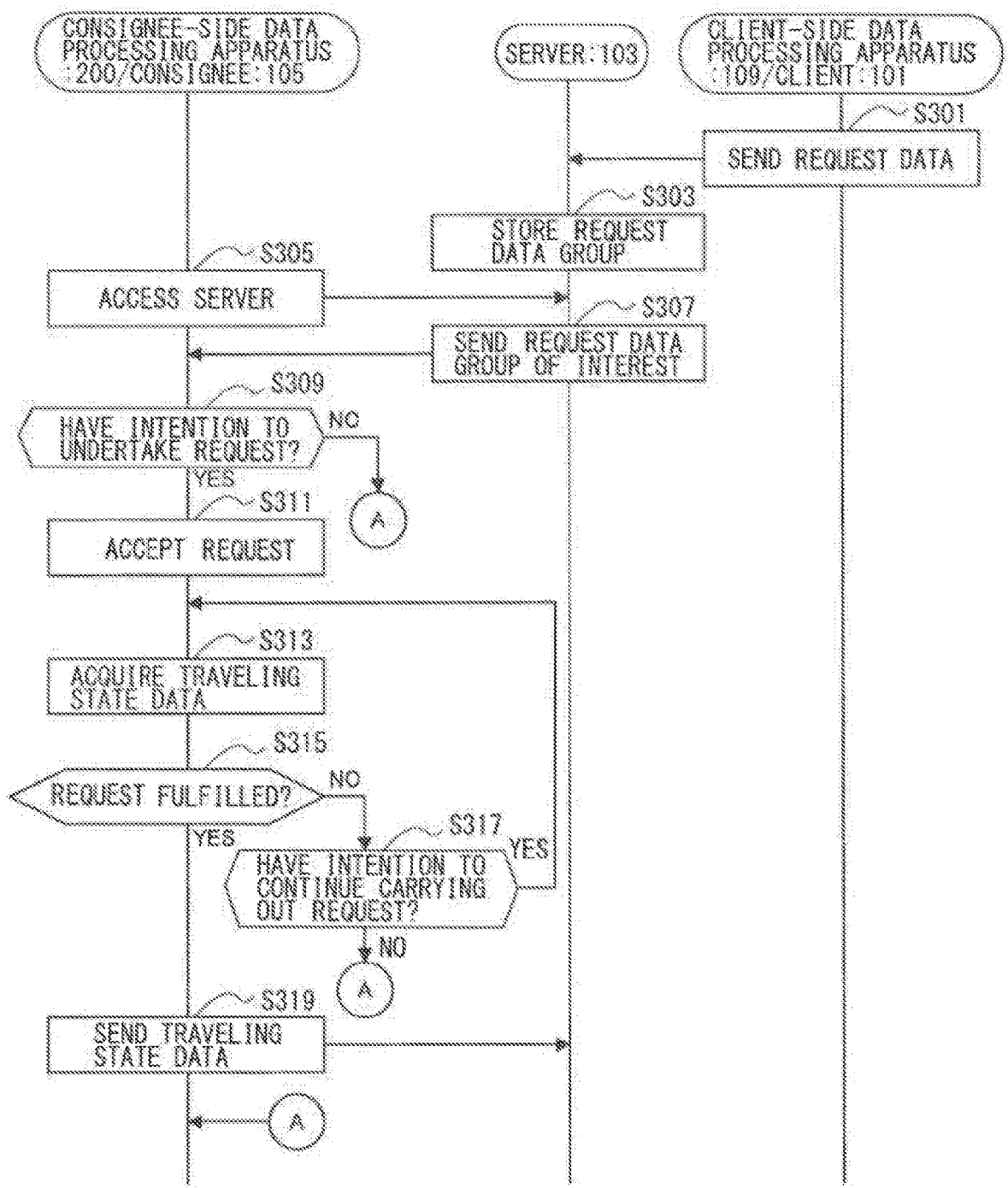
FIG. 8 is a sequence diagram illustrating an example operation of a data collecting system according to one example embodiment.

FIG. 8 is a sequence diagram illustrating vehicle data registration according to a third embodiment. In the first embodiment, the consignee 105 may cause the server 103 to store the data on the consignee 105 or the vehicle 107 using the consignee-side data processing apparatus 200. In the data collecting system 100 according to the third embodiment, there is no necessity for the consignee 105 to cause the server 103 to store the data. The request data may be sent to the data processing apparatus on the basis of the data to which the consignee has referred upon the data collection. The third embodiment may differ from the first embodiment in this respect. Note that the description of features of the data collecting system 100 according to the third embodiment common to those according to the first embodiment is not repeated here. The client 101 may first send request data to the server 103 using the client-side data processing apparatus 109 (Step S301). The server 103 may store the request data received from the client-side data processing apparatus 109 (Step S303). Thereafter, the consignee 105 may access the server 103 using the consignee-side data processing apparatus 200, and may refer to the request data stored in the server 103 (Step S305). The server 103 may send the request data to consignee-side data processing apparatus 200 in response to the access of the consignee-side data processing apparatus 200 to the server 103 (Step S307).

The consignee 105 may refer to the request data using the consignee-side data processing apparatus 200, to select request data to undertake. The consignee-side data processing apparatus 200 may determine whether the consignee 105 has an intention to undertake a request on the basis of whether the consignee 105 has undertaken any request data (Step S309). For example, when a plurality of pieces of request data is sent to the consignee-side data processing apparatus 200, the consignee-side data processing apparatus 200 may determine whether the consignee 105 has an intention to undertake any or all of the requests indicated by the pieces of request data. If the consignee 105 is determined as having an intention to undertake the request (Step S309: YES), the request may be accepted (Step S311). In contrast, if the consignee 105 is determined as having no intention to undertake the request (Step S309: NO), the procedure according to the embodiment may end.

After the request is accepted in Step S311, the consignee-side data processing apparatus 200 may start acquiring the traveling state data (Step S313). For example, the data acquiring unit 211 of the consignee-side data processing apparatus 200 may acquire data necessary for fulfillment of the request outputted from the data measurement device 311 or the vehicle position measurement device 313. Additionally, the consignee-side data processing apparatus 200 may provide the driver with information (e.g., a designated driving method or a route) by means of sound, image, or the like, depending on the content of request. Thereafter, the consignee-side data processing apparatus 200 may determine whether the content of request indicated by the request data is fulfilled (Step S315). If the request is determined as being fulfilled (Step S315: YES), the consignee-side data processing apparatus 200 may send the traveling state data to the server 103 (Step S319). For example, when the consignee 105 has undertaken a plurality of requests, the traveling state data may be sent to the server 103 every time each request is fulfilled. Alternatively, a plurality of pieces of the traveling state data relevant to the plurality of requests may be collectively sent to the server 103.

In contrast, if the request is determined as not being fulfilled (Step S315: NO), it may be determined whether the consignee 105 has an intention to continue carrying out the request (Step S317). If the consignee 105 has an intention to continue carrying out the request (Step S317: YES), the procedure may return to Step S313 in which the traveling state data is acquired. If the consignee 105 has no intention to continue carrying out the request (Step S317: NO), the procedure according to the embodiment may end. One example operation of the data collecting system 100 according to the third embodiment has been described in the above.

According to the third embodiment, the consignee-side data processing apparatus 200 may send the traveling state data to the server 103 in Step 319 after the request has been determined as being fulfilled in Step S315. Alternatively, the traveling state data may be sent to the server 103 when needed before the fulfillment of the request.

With a technique which fails to take into consideration of the condition of a consignee (who collects data) for acceptance of a request (hereinafter simply referred to as a "request acceptance condition"), it is difficult to collect data consistent with the wishes of a client (who requests for data collection). According to the embodiment, however, the server 103 may send a plurality of pieces of request data to the consignee-side data processing apparatus 200, and the consignee 105 may select a request to undertake from the pieces of the request data as appropriate and fulfill the request. This allows for selection of request data in consideration of the request acceptance condition of the consignee 105 or an intention of the consignee 105 to undertake the request. Accordingly, it is possible to collect traveling state data consistent with the client's 101 wishes, and enhance the certainty of collection of the traveling state data consistent with the client's 101 wishes.

3.3 Modification Example 1

Figure 9:
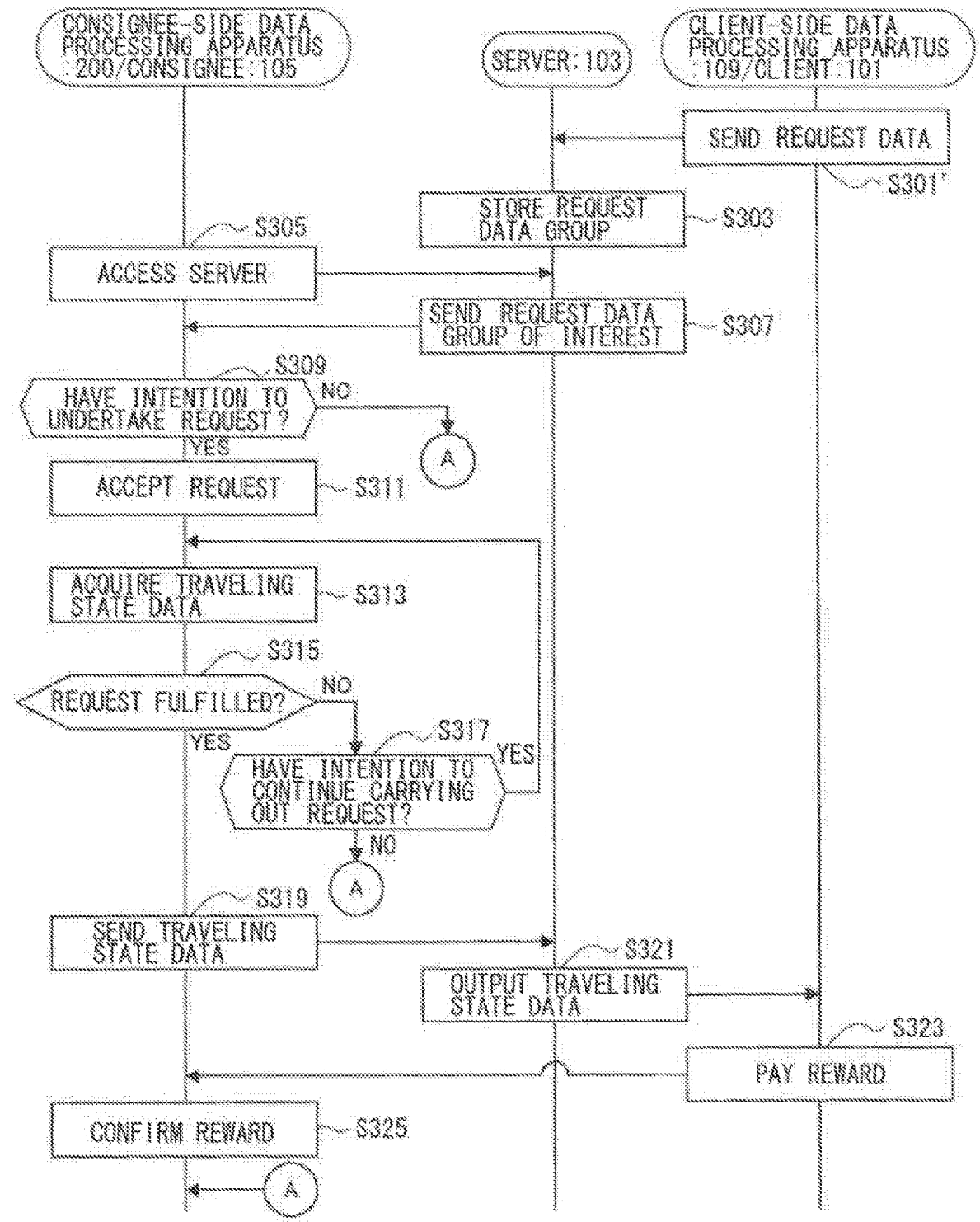
FIG. 9 is a sequence diagram illustrating a modification example of the data collecting system according to one example embodiment.

One modification example of the data collecting system 100 according to the third embodiment will now be described with reference to FIG. 9. FIG. 9 is a sequence diagram illustrating an example operation of the data collecting system 100 according to the modification example. In the modification example, the request data may include data on a reward for the request. The data on a reward may be set by the client 101. When the consignee 105 has undertaken and fulfilled the request, the reward for the request may be paid from the client 101. Since other configurations of the modification example may be common to those of the first embodiment, the description thereof is not repeated here.

With reference to FIG. 9, the client 101 may set data on a reward for the request as well as the content of request, and then send the request data to the server 103 (Step S301'). In the modification example, Steps S303 to S319 subsequent to Step S301' may be substantially the same as those in the sequence diagram illustrated in FIG. 8.

After the consignee-side data processing apparatus 200 sends the traveling state data to the server 103 in Step S319, the server 103 may output the traveling state data to the client-side data processing apparatus 109 (Step S321). The client 101 may confirm information on the results of fulfillment of the request, and may pay a reward depending on the results of the fulfillment (Step S323). The reward may be paid by transmitting the data on the reward from the client-side data processing apparatus 109 to the consignee-side data processing apparatus 200. The consignee 105 may confirm the data on the reward for the request (Step S325).

According to the modification example, the reward may be paid to the consignee 105 upon the fulfillment of the request. This gives the consignee 105 an incentive to undertake requests. Further, the consignee 105 is allowed to determine whether to undertake a request on the basis of the reward for the request. This encourages the consignee 105 to vigorously undertake a request and fulfill the requests. As a result, it is possible to fulfill the request consistent with the client's 101 wishes, and enhance the certainty of collection of the traveling state data consistent with the client's 101 wishes.

3.4 Modification Example 2

In another modification example of the data collecting system 100 according to the third embodiment, the traveling route data may be calculated in a similar way to Modification Example 2 of the first embodiment, and the server 103 may output the traveling route data.

4. Fourth Embodiment

Figure 10:
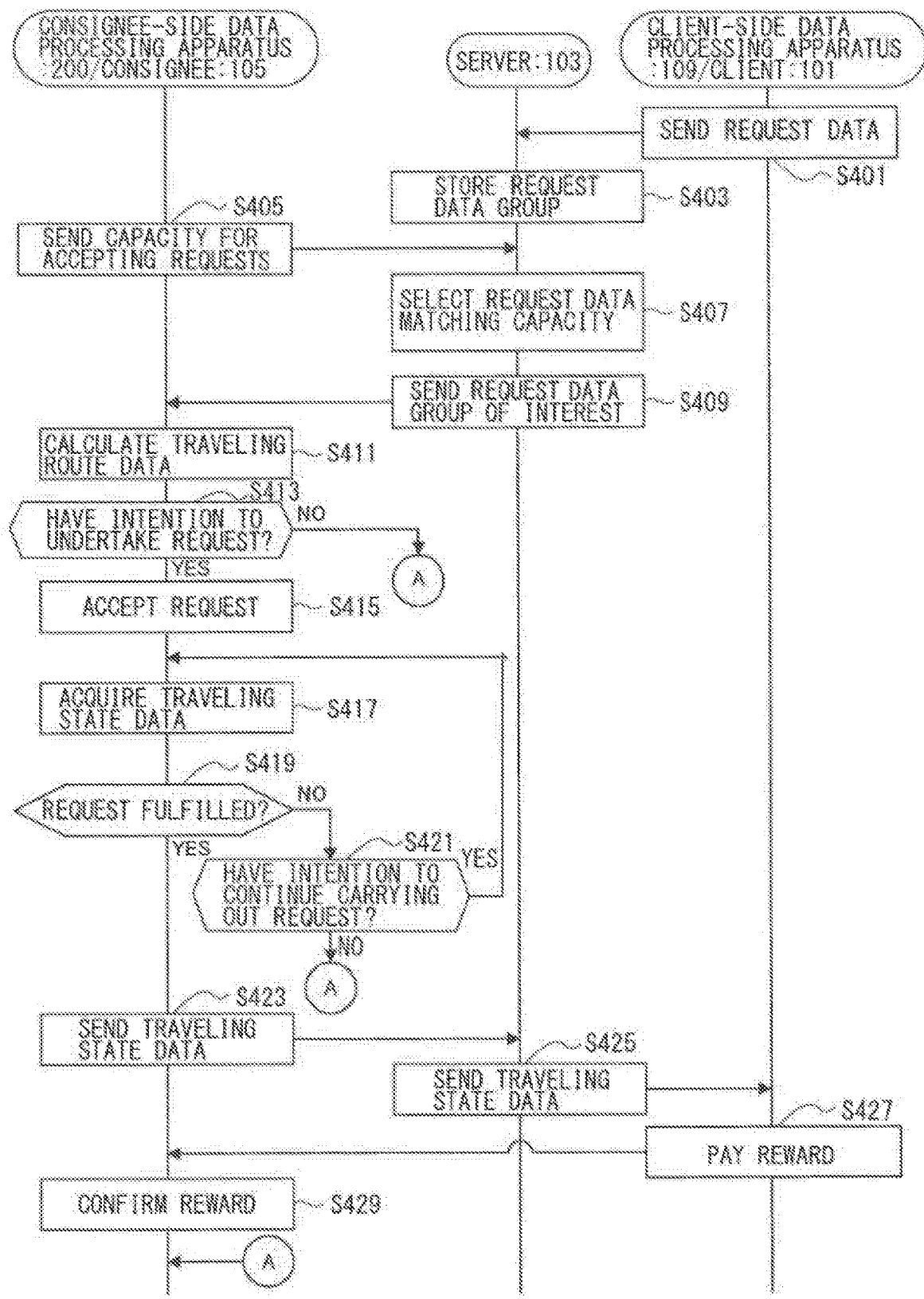
FIG. 10 is a sequence diagram illustrating an example operation of a data collecting system according to one example embodiment of the technology.

An example operation of the data collecting system 100 according to a fourth embodiment will now be described with reference to FIG. 10. FIG. 10 is a sequence diagram illustrating an example operation of the data collecting system 100 according to the fourth embodiment. The data collecting system 100 according to the fourth embodiment may differ from that according to the first embodiment in that the request acceptance condition set by the consignee 105 includes capacity of the consignee 105 for accepting requests. Note that the description of other configurations of the data collecting system 100 of the fourth embodiment common to those of the first embodiment is not repeated here.

As illustrated in FIG. 10, the client 101 may first send request data to the server 103 using the client-side data processing apparatus 109 (Step S401). The server 103 may store the request data received from the client-side data processing apparatus 109 (Step S403). Thereafter, the consignee 105 may set, to the consignee-side data processing apparatus 200, their capacity for accepting requests. For example, the consignee 105 may input, to the consignee-side data processing apparatus 200, data on what kind of request or condition they are able to accept, in a qualitative or quantitative manner.

The capacity of the consignee 105 for accepting requests may include requirements or limitations regarding the content of request. Examples of the requirements or limitations regarding the content of request may include requirements or limitations on an execution time for fulfillment of the request, a distance from a current position, or physical effects caused by the request (e.g., degree of tiredness or emotional shift). In an example case where the capacity is low for a distance from a current position, i.e., where the consignee 105 is only able to undertake a request executable in a narrow area, a limitation may be set that narrows down to the requests which are executable within ten kilometers from the current position of the vehicle 107 or in a specific regions (city, ward, town, or village), for example. In an example case where the capacity is low for physical effects, i.e., where the consignee 105 is only able to take limited physical effects, a limitation may be set that narrows down to the requests which do not require traveling on an unpaved road, traveling on a road with a narrow width, or traveling on a freeway, for example.

In Step 405, the consignee-side data processing apparatus 200 may send, to the server 103, the data on capacity of the consignee 105 for requests. On the basis of the data on capacity of the consignee 105 for accepting requests received from the consignee-side data processing apparatus 200, the server 103 may select the request data matching the capacity, as request data of interest (Step S407), and may send the selected request data to the consignee-side data processing apparatus 200 (Step S409).

Upon receiving the request data, the consignee-side data processing apparatus 200 may calculate a traveling route data for the vehicle on the basis of the request data (Step S411). Alternatively, the traveling route data may be calculated by the server 103. In this case, the server 103 may send the traveling route data together with the request data.

Since Step S413 and subsequent steps of the fourth embodiment are substantially the same as Step S309 and the subsequent steps illustrated in FIG. 8, the description thereof is not repeated here. One example operation of the data collecting system according to the fourth embodiment has been described in the above.

According to the fourth embodiment, the request acceptance condition set by the consignee 105 may include the capacity of the consignee 105 for accepting requests. This allows the consignee 105 to undertake the request consistent with their wishes or requirements without paying time and efforts on selection of requests. Accordingly, it is possible to enhance the certainty of collection of the traveling state data consistent with the client's 101 wishes.

5. Fifth Embodiment

Figure 11:
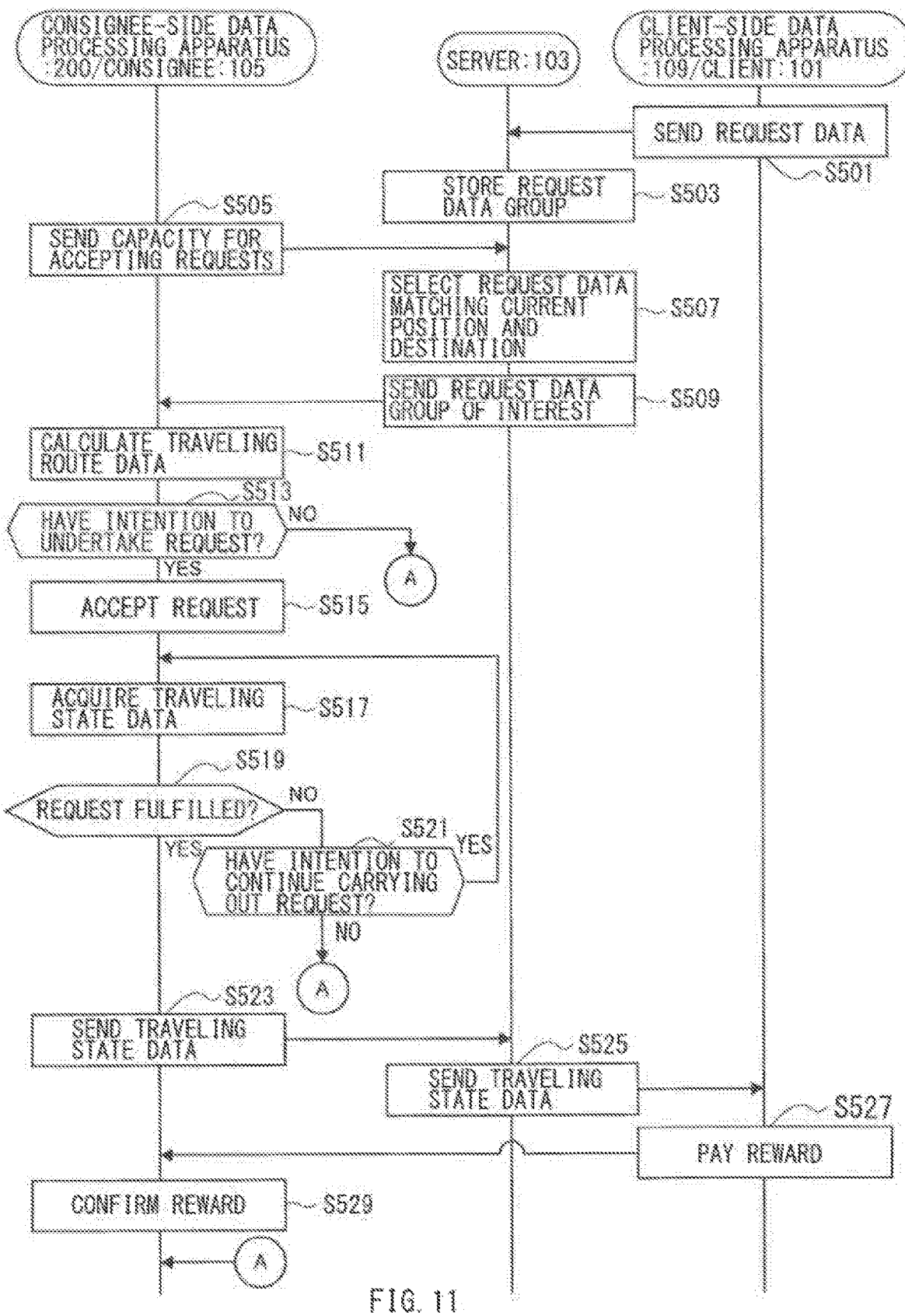
FIG. 11 is a sequence diagram illustrating an example operation of the data collecting system according to one example embodiment of the technology.

An example operation of the data collecting system 100 according to a fifth embodiment of the technology will now be described with reference to FIG. 11. FIG. 11 is a sequence diagram illustrating an example operation of the data collecting system 100 according to the fifth embodiment. The data collecting system of the fifth embodiment may differ from those of the other embodiments in that the request acceptance condition set by the consignee 105 include a current position of the vehicle 107 or a destination. Note that the description of other configurations of the data collecting system 100 of the fifth embodiment common to those of the other embodiments is not repeated here.

As illustrated in FIG. 11, the client 101 may first send request data to the server 103 using the client-side data processing apparatus 109 (Step S501). The server 103 may store the request data received from the client-side data processing apparatus 109 (Step S503). Thereafter, the consignee-side data processing apparatus 200 may send, to the server 103, data on the current position of the vehicle 107 or the destination (Step S505). For example, the consignee 105 may set the data on destination of the vehicle 107 using the consignee-side data processing apparatus 200. Alternatively, the consignee-side data processing apparatus 200 may acquire the current position of the vehicle 107 on the basis of the results of measurement by the vehicle position measurement device 313. The consignee-side data processing apparatus 200 may send, to the server 103, the data on current position or destination.

The server 103 may select request data on the basis of the data on the current position or destination received from the consignee-side data processing apparatus 200 (Step 507). For example, the server 103 may select a request that the consignee 105 is able to fulfill while driving the vehicle 107, on the basis of the data on the current position or destination. Additionally, the server 103 may calculate data on a traveling distance from the current position to the destination, traveling time, or the like, and may select request data including a content that satisfies these conditions. Thereafter, the server 103 may send the selected request data to the consignee-side data processing apparatus 200 (Step S509).

Since Step S511 and subsequent steps of the fifth embodiment are substantially the same as Step S411 and the subsequent steps illustrated in FIG. 10, the description thereof is not repeated here. One example operation of the data collecting system 100 according to the fifth embodiment has been described in the above.

According to the fifth embodiment, the request acceptance condition set by the consignee 105 may include the data on the current position of the vehicle or the destination. This allows the consignee 105 to undertake the request consistent with their wishes or requirements without paying time and efforts on selection of requests. Accordingly, it is possible to enhance the certainty of collection of the traveling state data consistent with the client's 101 wishes.

6. Sixth Embodiment

Figure 12A:
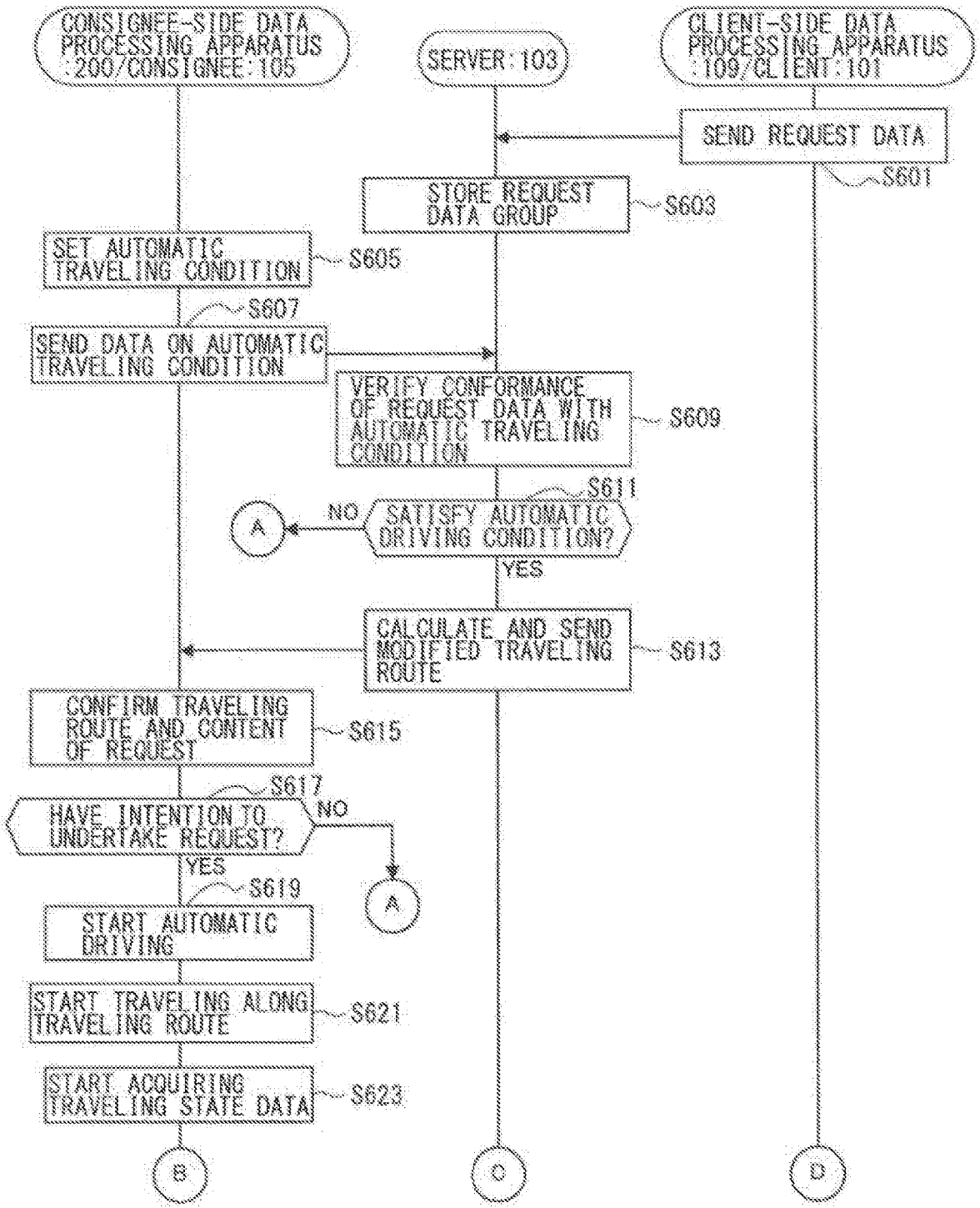
FIG. 12A is a sequence diagram illustrating an example operation of a data collecting system according to one example embodiment of the technology.
Figure 12B:
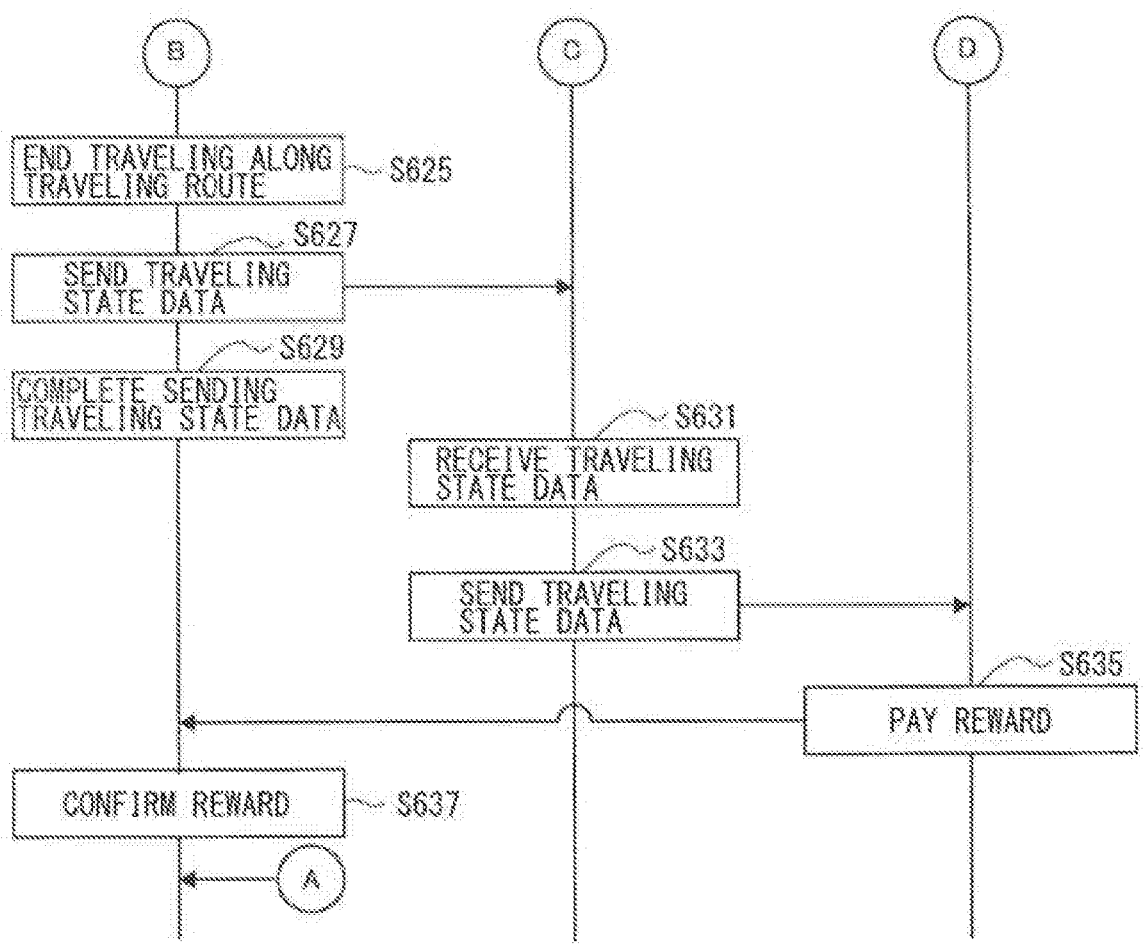
FIG. 12B is a sequence diagram illustrating an example operation of the data collecting system according to one example embodiment.

An example operation of the data collecting system 100 according to a sixth embodiment of the technology will now be described with reference to FIGS. 12A and 12B. FIGS. 12A and 12B are sequence diagrams each illustrating an example operation of the data collecting system 100 according to the sixth embodiment. The data collecting system 100 of the sixth embodiment may differ from those of the other embodiments in that the vehicle 107 has an automatic driving function, and that the request acceptance condition set by the consignee 105 includes an automatic traveling condition set by the consignee 105. Note that the description of other configurations of the data collecting system 100 according to the sixth embodiment common to those of the other embodiments is not repeated here.

As illustrated in FIG. 12A, the client 101 may first send request data to the server 103 using the client-side data processing apparatus 109 (Step S601). The server 103 may store the request data received from the client-side data processing apparatus 109 (Step S603). Thereafter, the consignee 105 may set an automatic traveling condition to be satisfied during an operation of the automatic traveling function (Step S605). The automatic traveling condition may include a time for detouring, a maximum acceleration rate in a frontward/rearward direction, upward/downward (vertical) direction, or rightward/leftward (horizontal) direction, an occurrence of damage on the vehicle 107 during traveling, or a tolerance rate or threshold for an energy (fuel or electric) consumption rate, in case of the request being accepted. Alternatively, the automatic traveling condition may include one or both of a destination and a traveling route. In an example case where the vehicle 107 that travels to fulfill the request is an unattended vehicle, the automatic traveling condition may include a schedule for usage of the vehicle 107.

In Step S607, the consignee-side data processing apparatus 200 may send, to the server 103, the automatic traveling condition set for the vehicle 107. After receiving the data on the automatic traveling condition, the server 103 may verify whether there is any request data satisfying the automatic traveling condition (Step S609).

In one example where the automatic traveling condition includes a time for detouring, the verification of conformance in Step S609 may be performed on the basis of the following expression:

$$T2 \leq T0+T1 \qquad \text{Conditional Expression 1}$$

where T0 denotes a required time to the destination in case of the request not being undertaken, T1 denotes an allowable detouring time, and T2 denotes a required time to the destination in case of the request being undertaken.

If Conditional Expression 1 is satisfied, the server 103 may determine that the request data satisfies the automatic traveling condition. Note that, also in a case where the automatic traveling condition includes a speed, an acceleration rate, an angular acceleration rate, an occurrence of damage during traveling, an energy consumption rate, or the like, a conditional expression similar to Conditional Expression 1 may be used to determine the conformance of the request data with the automatic traveling condition.

In one example where the automatic traveling condition is about an acceleration rate, a turning radius and a horizontal acceleration rate that are respectively calculated from a scheduled traveling route and a vehicle speed may be applied to the conditional expression to estimate an occurrence of a horizontal acceleration. Additionally, a vertical acceleration rate calculated from the history of past traveling is applied to the conditional expression to estimate an occurrence of a vertical acceleration.

On the basis of the results of the verification of conformance of the request data with the automatic traveling condition in Step S609, a determination may be made as to whether there is any piece of request data satisfying the automatic driving condition (Step S611). When it is determined that there is no request data satisfying the automatic traveling condition (Step S611: NO), the procedure may end. In contrast, when it is determined that there is request data satisfying the automatic traveling condition (Step S611: YES), the server 103 may calculate a modified traveling route and send the request data satisfying the automatic traveling condition and the modified traveling route to the consignee-side data processing apparatus 200 (Step S613).

The consignee 105 may confirm the information on the traveling route and the content of request (Step S615). The consignee-side data processing apparatus 200 may determine whether the consignee 105 has an intention to accept the content of request data (Step S617). For example, the consignee-side data processing apparatus 200 may determine whether the consignee 105 has an intention to undertake the request data on the basis of whether the consignee 105 has performed an operation for undertaking the request. When it is determined that the consignee 105 has no intention to undertake the request (Step S617: NO), the procedure according to the sixth embodiment may end. In contrast, when it is determined that the consignee 105 has an intention to undertake the request (Step S617: YES), automatic traveling may start (Step S619). After the start of the automatic traveling, the vehicle 107 may travel along the traveling route on the basis of the traveling route data (Step S621). The consignee-side data processing apparatus 200 may start acquiring the traveling state data (Step S623).

Thereafter, with reference to FIG. 12B, traveling along the traveling route to fulfill the request may end (Step S625), and acquired traveling state data may be sent to the server 103 (Step S627). Thereafter, sending the traveling state data may be completed (Step S629).

The server 103 may receive the traveling state data (Step S631), and may then send the traveling state data to the client-side data processing apparatus 109 (Step S633). The client 101 may confirm the information on the results of fulfillment of the request and pay a reward depending on the results (Step S635). The reward may be paid by transmitting the data on the reward from the client-side data processing apparatus 109 to the consignee-side data processing apparatus 200. The consignee 105 may confirm the data on the reward for the request (Step S637). One example operation of the data collecting system 100 according to the sixth embodiment has been described in the above.

According to the sixth embodiment, the request acceptance condition set by the consignee 105 may include the automatic traveling condition of the vehicle 107 with an automatic traveling function. The automatic traveling condition of the vehicle 107 may be set by the consignee 105. This allows the consignee 105 to undertake the request consistent with their wishes or requirements without paying time and efforts on selection of requests. Accordingly, it is possible to enhance the certainty of collection of the traveling state data consistent with the client's 101 wishes.

Furthermore, according to the sixth embodiment, the traveling state data may be acquired by use of the automatic traveling function of the vehicle 107. This allows for collection of traveling state data with higher accuracy than traveling state data acquired by use of traveling of a manned vehicle.

Although the server 103 may calculate the modified traveling route in the sixth embodiment, embodiments of the technology is not limited thereto. Alternatively, the consignee-side data processing apparatus 200 may calculate the modified traveling route on the basis of the received request data.

7. Seventh Embodiment

Figure 13A:
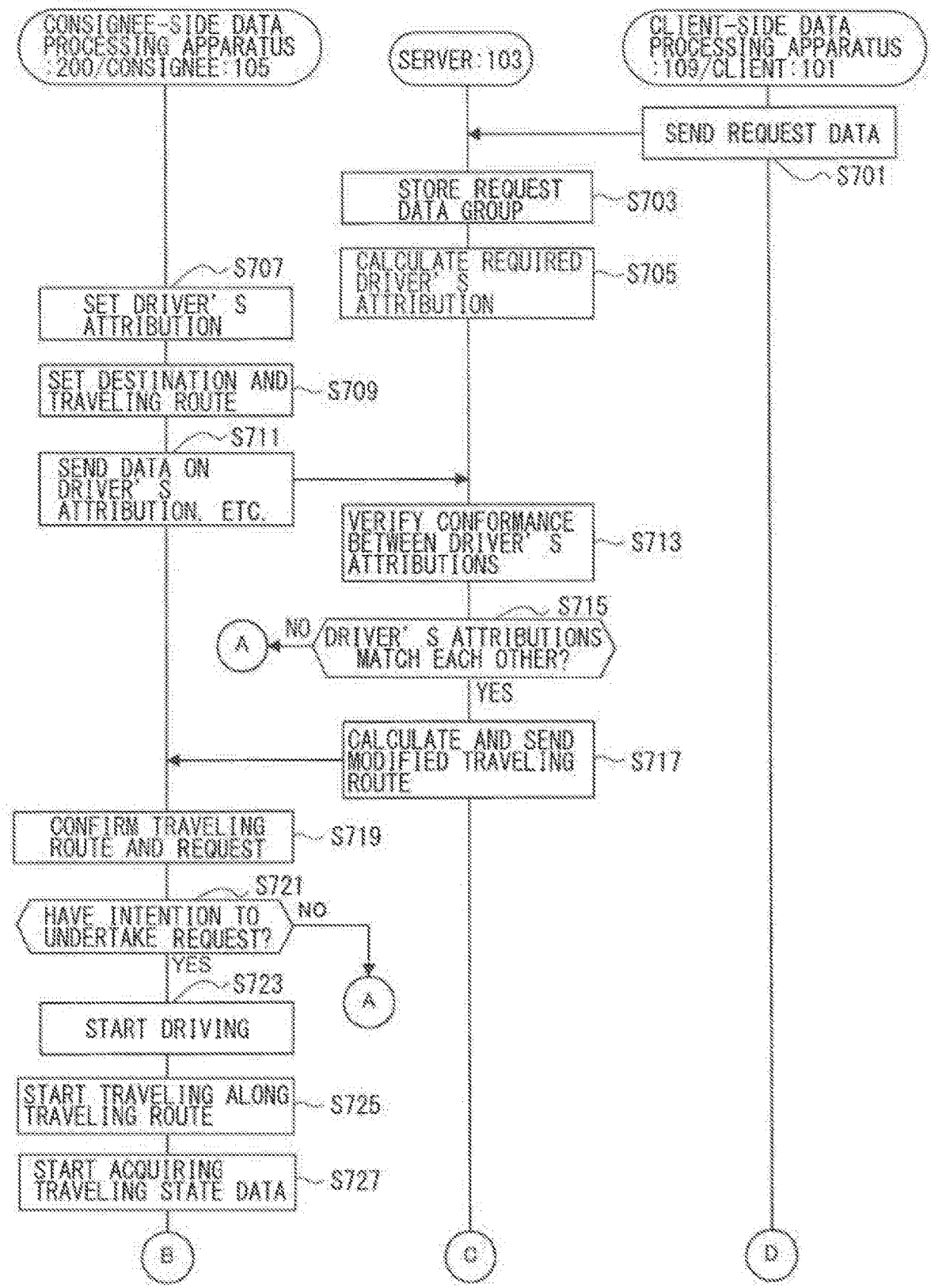
FIG. 13A is a sequence diagram illustrating an example operation of a data collecting system according to one example embodiment of the technology.
Figure 13B:
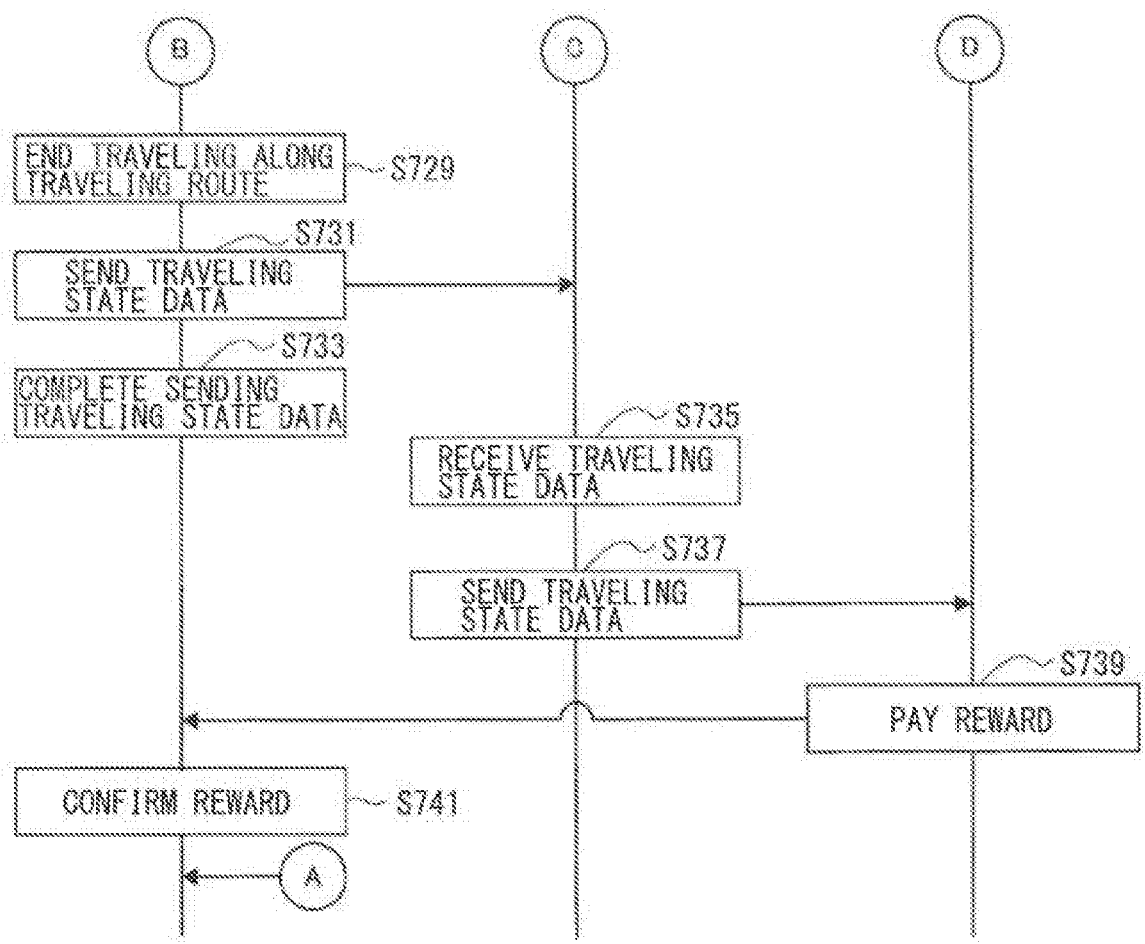
FIG. 13B is a sequence diagram illustrating an example operation of a data collecting system according to one example embodiment of the technology.

An example operation of the data collecting system 100 according to a seventh embodiment will now be described with reference to FIGS. 13A and 13B. FIGS. 13A and 13B are sequence diagrams each illustrating an example operation of the data collecting system 100 according to the seventh embodiment. The data collecting system 100 according to the seventh embodiment may differ from those of the other embodiments in that the request acceptance condition set by the consignee 105 includes a driver's attribution. Note that the description of other configurations of the data collecting system 100 according to the seventh embodiment common to those of the other embodiments is not repeated here.

As illustrated in FIG. 13A, the client 101 may first send request data to the server 103 using the client-side data processing apparatus 109 (Step S701). The server 103 may store the request data received from the client-side data processing apparatus 109 (Step S703). Thereafter, the server 103 may calculate data on driver's attribution required for fulfillment of a request for each order data (Step S705).

The consignee 105 may set the driver's attribution (Step S707). The driver's attribution may include data on driving skills of the driver. Examples of the data on driving skills may include the type of a driver's license, the number of years since the acquisition of the driver's license, or results of evaluation of the driving skills.

The consignee 105 may also set a destination and a traveling route (Step S709). The consignee-side data processing apparatus 200 may send the data on the driver's attribution set in Step S707 and the data on destination and traveling route set in Step S709 to the server 103 (Step S711). The server 103 may verify conformance of the data on driver's attribution set in Step S707 with the data on driver's attribution calculated in Step S705 (S713).

In an example case where the driver's attribution is the number of years since the acquisition of the driver's license, the verification of conformance in Step S713 may involve determining whether the number of years since the acquisition of the driver's license is greater than a required number of years since the acquisition of a driver's license calculated on the basis of the request data. In another example case, the verification of conformance in Step S713 may involve determining whether the evaluation of driver's driving skills is better than a required evaluation of driver's driving skills calculated on the basis of the request data.

In still another example case, the driver's attribution may be a total traveling distance, age or gender of the driver, or the history of traveling along the traveling route for the request. Also in such a case, conformance with the required driver's attribution set by the client 101 may be verified in a similar way. The driver's driving skills may be evaluated by the driver themselves or a passenger. Alternatively, the driver's driving skills may be evaluated on the basis of the history of past traveling.

Since Step S717 and subsequent steps of the seventh embodiment illustrated in FIGS. 13A and 13B are substantially the same as Step S613 and the subsequent steps illustrated in FIGS. 12A and 12B, the description hereof is not repeated here. One example operation of the data collecting system 100 according to the seventh embodiment has been described in the above.

According to the seventh embodiment, the request acceptance condition set by the consignee 105 may include the data on driver's attribution. This allows the consignee 105 to undertake a request consistent with their driving skills without paying time and efforts on selection of requests. Accordingly, it is possible to enhance the certainty of collection of the traveling state data consistent with the client's 101 wishes.

In the seventh embodiment, the required driver's attribution may be calculated by the server 103 on the basis of the content of request. However, the required driver's attribution may be set by the client 101, for example. For example, in a case where the client 101 wants a beginner driver with low driving skills or a professional driver with high driving skills to collect traveling state data, the client 101 may also set the required driver's attribution as the request data in advance.

In the seventh embodiment, the data on driver's attribution may be set by the consignee 105. However, the data on driver's attribution may be automatically set by an operation in conjunction with the data stored in the consignee-side data processing apparatus 200 or the server 103 in advance.

Alternatively, in the seventh embodiment, the data on evaluation of the driver's skills, the history of traveling, or the like, of the driver's attribution may be automatically stored or updated at the server 103 or the consignee-side data processing apparatus 200, depending on the results of fulfillment of a request.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

Some of the steps of the process illustrated in the sequence diagram described in the foregoing embodiments and modification examples may be omitted or additional steps may be included in the process. Some of the steps may be simultaneously executed or may be carried out in a request different from the request described herein.

The server 103 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the server 103. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all 6 or a part of the functions of the server 103 illustrated in FIG. 1.

The invention claimed is:

1. A data collecting system comprising:
a server configured to hold at least one piece of request data, the at least one piece of request data including at least i) a content of a request for collection of traveling state data on a vehicle and ii) a requisite condition for the collection of the traveling state data, the content of the request and the requisite condition being set by a client; and
a first data processing apparatus associated with the vehicle, the vehicle being associated with a consignee,
wherein, when the server determines that the consignee or the vehicle satisfies the requisite condition, the server is configured to send request data of interest to the first data processing apparatus, the request data of interest being selected from the at least one piece of request data held in the server,
wherein the first data processing apparatus is configured to acquire, from the vehicle of the consignee, traveling state data of the vehicle on a basis of the request data of interest received from the server, and to send the acquired traveling state data of the vehicle to the server,
wherein the first data processing apparatus is configured to acquire the traveling state data on a basis the request data satisfying a request acceptance condition, the request acceptance condition comprising a condition under which the consignee undertakes the request for collection of the traveling state data, wherein the server is configured to execute either (1) or (2) of:
(1) when the at least one piece of request data comprises a plurality pieces of request data, the server is configured to send the plurality pieces of request data to the first data processing apparatus such that the first data processing apparatus is configured to acquire the traveling state data on a basis of a result of selection of a request by the consignee, the selection of the request by the consignee being based on the request acceptance condition; and
(2) the server is configured to select the request data of interest to be sent to the first data processing apparatus on a basis of the request acceptance condition received from the first data processing apparatus, and to send the request data of interest to the first data processing apparatus, wherein the data on the vehicle includes detection accuracy of a sensor provided in the vehicle, and wherein, when the sensor satisfies a predetermined criterion of verification of detection accuracy of the sensor, the first data processing apparatus acquires a result of the verification of the detection accuracy of the sensor.

2. The data collecting system according to claim 1, wherein the requisite condition for the collection of the traveling state data includes data on the vehicle.

3. The data collecting system according to claim 1, wherein the request acceptance condition includes a capacity of the consignee, the capacity of the consignee being directed to a time for execution of the request or a physical effect caused by the execution of the request.

4. The data collecting system according to claim 1, wherein the request acceptance condition includes a current position of the vehicle or a destination.

5. The data collecting system according to claim 1, wherein
the vehicle is configured to perform an automatic traveling operation, and
the request acceptance condition includes an automatic traveling condition to be satisfied upon a start of the automatic traveling operation, the automatic traveling condition being set by the consignee.

6. The data collecting system according to claim 1, wherein the request acceptance condition includes an attribution of a driver of the vehicle.

7. The data collecting system according to claim 1, wherein the server is configured to calculate traveling route data on a basis of the request data of interest, the traveling route data indicating a traveling route of the vehicle.

8. The data collecting system according to claim 7, wherein the server is configured to send, to the first data processing apparatus, the traveling route data together with the request data of interest.

9. The data collecting system according to claim 7, wherein the first data processing apparatus is configured to calculate traveling route data on a basis of the request data of interest received from the server, the traveling route data indicating a traveling route of the vehicle.

10. The data collecting system according to claim 1, wherein the at least one piece of request data includes data on a reward for the request.

11. The data collecting system according to claim 10, wherein the server is configured to send the traveling state data to a second data processing apparatus on a side of the client, and the server or the second data processing apparatus is configured to send the data on the reward to the first data processing apparatus in response to reception of the traveling state data.

12. The data collecting system according to claim 10, wherein the reward is set to be variable depending on the requisite condition for the collection of the traveling state data.

13. A server comprising
circuitry configured to:
hold at least one piece of request data, the at least one piece of request data including at least a content of a request for collection of traveling state data on a vehicle and a requisite condition for the collection of the traveling state data, the content of the request and the requisite condition being set by a client; and
when the vehicle or a consignee associated with the vehicle satisfies the requisite condition, send request data of interest to a first data processing apparatus associated with the vehicle of the consignee, the request data of interest being selected from the at least one piece of request data held in the server, wherein the first data processing apparatus is configured to acquire the traveling state data on a basis the request data satisfying a request acceptance condition, the request acceptance condition comprising a condition under which the consignee undertakes the request for collection of the traveling state data, wherein the circuitry is configured to execute either (1) or (2) of:
(1) when the at least one piece of request data comprises a plurality pieces of request data, the circuitry is configured to send the plurality pieces of request data to the first data processing apparatus such that the first data processing apparatus acquires the traveling state data on a basis of a result of selection of a request by the consignee, the selection of the request by the consignee being based on the request acceptance condition; and
(2) the circuitry is configured to select the request data of interest to be sent to the first data processing apparatus on a basis of the request acceptance condition received from the first data processing apparatus, and to send the request data of interest to the first data processing apparatus, wherein the data on the vehicle includes detection accuracy of a sensor provided in the vehicle, and wherein, when the sensor satisfies a predetermined criterion of verification of detection accuracy of the sensor, the first data processing apparatus acquires a result of the verification of the detection accuracy of the sensor.

14. A data processing apparatus equipped on a vehicle, the data processing apparatus comprising:
a processor; and
a communicator configured to communicate with an external device outside the vehicle,
wherein, when the vehicle or a consignee associated with the vehicle satisfies a requisite condition for collecting traveling state data of the vehicle, the communicator is configured to receive, from the external device, request data including a content of a request for collecting the traveling state data on the vehicle, the content of the request being set by a client, wherein the processor is configured to acquire the traveling state data on a basis of the request data satisfying a request acceptance condition, the request acceptance condition comprising a condition under which a consignee undertakes the request for collection of the traveling state data, wherein the communicator is configured to send the acquired traveling state data to the external device, wherein the processor is configured to execute either (1) or (2) of:

(1) when at least one piece of request data stored in the external device comprises a plurality pieces of request data, the processor is configured to acquire the traveling state data on a basis of a result of selection of a request by the consignee, the selection of the request by the consignee being based on the request acceptance condition, the request being selected from the plurality pieces of request data received from the external device via the communicator; and (2) the processor is configured to receive request data of interest from the external device via the communicator, the request data of interest being selected by and sent from the external device on a basis of the request acceptance condition, the request acceptance condition used in selecting the request data of interest being sent to the external device from the communicator, wherein the data on the vehicle includes detection accuracy of a sensor provided in the vehicle, and wherein, when the sensor satisfies a predetermined criterion of verification of detection accuracy of the sensor, the processor acquires a result of the verification of the detection accuracy of the sensor.

* * * * *